United States Patent
Kim et al.

(10) Patent No.: US 12,542,703 B2
(45) Date of Patent: Feb. 3, 2026

(54) RESOURCE CONFIGURATION METHOD AND APPARATUS FOR TRANSMISSION OR RECEPTION OF UPLINK OR DOWNLINK IN WIRELESS COMMUNICATION SYSTEM

(71) Applicant: Samsung Electronics Co., Ltd., Suwon-si (KR)

(72) Inventors: Taehyoung Kim, Suwon-si (KR); Jinkyu Kang, Suwon-si (KR); Youngbum Kim, Suwon-si (KR); Younsun Kim, Suwon-si (KR); Hyoungju Ji, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 500 days.

(21) Appl. No.: 17/767,849

(22) PCT Filed: Oct. 12, 2020

(86) PCT No.: PCT/KR2020/013880
§ 371 (c)(1),
(2) Date: Apr. 8, 2022

(87) PCT Pub. No.: WO2021/071343
PCT Pub. Date: Apr. 15, 2021

(65) Prior Publication Data
US 2023/0056799 A1 Feb. 23, 2023

(30) Foreign Application Priority Data

Oct. 11, 2019 (KR) .................. 10-2019-0126307

(51) Int. Cl.
*H04L 27/26* (2006.01)
*H04L 5/00* (2006.01)
(Continued)

(52) U.S. Cl.
CPC ........ *H04L 27/2605* (2013.01); *H04L 5/0098* (2013.01); *H04W 72/1268* (2013.01); *H04L 5/1469* (2013.01)

(58) Field of Classification Search
None
See application file for complete search history.

(56) References Cited

U.S. PATENT DOCUMENTS

2007/0293214 A1    12/2007   Ansari et al.
2012/0307751 A1*   12/2012   Dinan .................. H04L 5/0042
                                                              370/329
(Continued)

FOREIGN PATENT DOCUMENTS

KR    10-2014-0136923 A    12/2014
KR    10-2019-0086152 A     7/2019

OTHER PUBLICATIONS

Supplementary Partial European Search Report dated Dec. 13, 2022, in connection with European Application No. 20874142.1, 17 pages.

(Continued)

*Primary Examiner* — Ayman A Abaza
*Assistant Examiner* — Camquyen Thai

(57) ABSTRACT

An operating method of a user equipment (UE) in a wireless communication system includes: receiving configuration information for a guard band; determining whether the guard band is activated based on the configuration information; and when the guard band is activated, determining whether to transmit an uplink channel according to an uplink-downlink configuration in a time domain and a frequency domain.

10 Claims, 17 Drawing Sheets

(51) Int. Cl.
*H04L 5/14* (2006.01)
*H04W 72/1268* (2023.01)

(56) References Cited

U.S. PATENT DOCUMENTS

| | | | | |
|---|---|---|---|---|
| 2013/0336178 | A1* | 12/2013 | Tiirola | H04W 56/00 370/280 |
| 2014/0161002 | A1* | 6/2014 | Gauvreau | H04L 5/14 370/280 |
| 2015/0011233 | A1* | 1/2015 | Kazmi | H04W 72/044 455/454 |
| 2015/0043392 | A1* | 2/2015 | Susitaival | H04W 72/0446 370/280 |
| 2015/0326378 | A1* | 11/2015 | Zhang | H04L 27/368 370/280 |
| 2015/0358138 | A1* | 12/2015 | Hwang | H04W 74/004 370/280 |
| 2016/0056916 | A1 | 2/2016 | Hassan et al. | |
| 2016/0080133 | A1* | 3/2016 | Golitschek Edler von Elbwart | H04W 76/28 370/280 |
| 2017/0310435 | A1* | 10/2017 | Wei | H04L 5/0044 |
| 2018/0019857 | A1* | 1/2018 | Kazmi | H04W 72/51 |
| 2018/0146485 | A1* | 5/2018 | Yang | H04L 5/0055 |
| 2018/0248662 | A1* | 8/2018 | Kim | H04L 5/143 |
| 2019/0089502 | A1* | 3/2019 | Yi | H04W 16/14 |
| 2019/0182899 | A1* | 6/2019 | Ye | H04W 4/80 |
| 2019/0190636 | A1* | 6/2019 | Kim | H04W 72/23 |
| 2019/0268198 | A1 | 8/2019 | Oketani | |
| 2019/0281610 | A1* | 9/2019 | Choi | H04L 5/001 |
| 2019/0342838 | A1* | 11/2019 | Kwak | H04W 52/38 |
| 2019/0357157 | A1* | 11/2019 | Sandgren | H04W 56/003 |
| 2020/0036586 | A1* | 1/2020 | Gao | H04W 16/10 |
| 2020/0170019 | A1* | 5/2020 | Joseph | H04W 72/23 |
| 2021/0100038 | A1* | 4/2021 | Ly | H04W 56/0015 |
| 2021/0185702 | A1 | 6/2021 | Kim et al. | |
| 2022/0014314 | A1* | 1/2022 | Wang | H04L 5/0055 |
| 2022/0060246 | A1* | 2/2022 | Tiirola | H04B 7/2643 |
| 2025/0038937 | A1* | 1/2025 | Tooher | H04W 24/10 |

OTHER PUBLICATIONS

Ibrahim, et al., "A Frame Structure with Precoding for Bidirectional Low Latency Applications," 2017 IEEE Globecom Workshops, IEEE, Dec. 2017, 5 pages.
NTT Docomo, Inc., "Justification for Supplemental Downlink for TD-LTE," RP-140712, 3GPP TSG-RAN #64, Sophia Antipolis, France, Jun. 10-13, 2014, 5 pages.
Supplementary European Search Report dated Apr. 24, 2023, in connection with European Application No. 20874142.1, 20 pages.
Ericsson, "Summary of 7.1.3.3 (resource allocation)," R1-1809702, TSG-RAN WG1 #94, Gothenburg, Sweden, Aug. 20-24, 2018, 28 pages.
ZTE, et al., "Remaining details on common aspects to support TDD NB-IoT," R1-1719719, 3GPP TSG RAN WG1 Meeting #91, Reno, USA, Nov. 27-Dec. 1, 2017, 5 pages.
International Search Report and Written Opinion of the International Searching Authority dated Dec. 30, 2020, in connection with International Application No. PCT/KR2020/013880, 16 pages.
ETRI, "Wideband operation for NR-U," R1-1908809, 3GPP TSG RAN WG1 Meeting #98, Prague, CZ, Aug. 26-30, 2019, 7 pages.
Qualcomm Incorporated, "Wideband operation for NR-U," R1-1909249, 3GPP TSG RAN WG1 Meeting #98, Prague, CZ, Aug. 26-30, 2019, 6 pages.
Sony, "Wideband operation for NR Unlicensed," R1-1906837, 3GPP TSG RAN WG1 #97, Reno, USA, May 13-17, 2019, 4 pages.
Vivo, "Potential solutions and techniques for NR unlicensed spectrum," R1-1801557, 3GPP TSG RAN WG1 Meeting #92, Athens, Greece, Feb. 26-Mar. 2, 2018, 6 pages.
Office Action issued Feb. 11, 2025, in connection with Korean Patent Application No. 10-2019-0126307, 6 pages.
InterDigital, Inc., "NR-U Wideband operation," R1-1910943, 3GPP TSG RAN WG1 #98bis, Chongqing, China, Oct. 14-20, 2019, 6 pages.
Communication pursuant to Article 94(3) EPC dated Jun. 3, 2025, in connection with European Application No. 20874142.1, 7 pages.

* cited by examiner

RESOURCE CONFIGURATION METHOD AND APPARATUS FOR TRANSMISSION OR RECEPTION OF UPLINK OR DOWNLINK IN WIRELESS COMMUNICATION SYSTEM

CROSS-REFERENCE TO RELATED APPLICATIONS

This application is a 371 National Stage of International Application No. PCT/KR2020/013880, filed Oct. 12, 2020, which claims priority to Korean Patent Application No. 10-2019-0126307, filed Oct. 11, 2019, the disclosures of which are herein incorporated by reference in their entirety.

BACKGROUND

1. Field

The disclosure relates to a method and apparatus for resource configuration for uplink or downlink transmission and reception in a wireless communication system.

2. Description of Related Art

To meet the increase in demand with respect to wireless data traffic after the commercialization of 4th generation (4G) communication systems, considerable efforts have been made to develop pre-5th generation (5G) communication systems or 5G communication systems. For this reason, 5G or pre-5G communication systems are called 'beyond 4G network' communication systems or 'post long-term evolution (post-LTE)' systems. Implementation of the 5G communication system using ultrahigh frequency (millimeter wave (mmWave)) bands, e.g., 60 giga hertz (GHz) bands, is being considered to attain higher data transfer rates. To alleviate path loss of radio waves and increase propagation distances of radio waves in an ultra-high frequency band, technologies for 5G communication systems, such as beamforming, massive multi-input multi-output (MIMO), full dimensional MIMO (FD-MIMO), array antenna, analog beamforming, and large-scale antenna system are being discussed. To improve system networks, for 5G communication systems, various technologies such as evolved small cells, advanced small cells, cloud radio access networks (cloud-RAN), ultra-dense networks, device-to-device (D2D) communication, wireless backhaul, moving networks, cooperative communication, coordinated multi-points (CoMP), and reception interference cancellation have been developed. In addition, for 5G communication systems, hybrid Frequency Shift Keying (FSK) and Quadrature Amplitude Modulation (QAM) (FQAM) and Sliding Window Superposition Coding (SWSC), which are Advanced Coding Modulation (ACM) schemes, and Filter Bank Multi-Carrier (FBMC), Non-Orthogonal Multiple Access (NOMA), and Sparse Code Multiple Access (SCMA), which are advanced access technologies, have been developed.

The Internet has evolved from a human-centered connection network, through which humans generate and consume information, to an Internet of Things (IoT) network that exchanges and processes information between distributed elements such as objects. An internet of everything (IoE) technology in which a big data processing technology via a connection with a cloud server or the like is combined with the IoT technology has emerged. To implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet (or, information) technology (IT) services may be provided to collect and analyze data obtained from objects connected to each other to create new value in human life. The IoT may be applied to fields such as smart homes, smart buildings, smart cities, smart cars or connected cars, smart grids, health care, smart home appliances, and advanced medical services through convergence and integration of existing information technology (IT) and various industries.

Various attempts are being made to apply 5G communication systems to the IoT network. For example, 5G communication such as sensor networks, M2M communication, MTC, and the like is being implemented by using techniques including beamforming, MIMO, array antennas, and the like. Application of cloud radio access network (Cloud-RAN) as the above-described big data processing technology may be an example of convergence of 5G communication technology and IoT technology.

As described above, various services may be provided due to the development of wireless communication systems, and thus, there is a need for methods of seamlessly providing such services.

SUMMARY

The disclosure provides a method and apparatus for resource configuration for effective uplink or downlink transmission and reception for various services in a mobile communication system.

According to an embodiment of the disclosure, an operating method of a user equipment (UE) in a wireless communication system includes receiving configuration information for a guard band, determining whether the guard band is activated based on the configuration information, and when the guard band is activated, determining whether to transmit an uplink channel according to an uplink-downlink configuration in a time domain and a frequency domain.

The method may further include, when the guard band is not activated, determining whether to transmit the uplink channel according to an uplink-downlink configuration of a time division duplex (TDD) system.

The method may further include receiving scheduling information for the uplink channel through higher-layer signaling, determining whether a transmission resource for the uplink channel overlaps at least a part of a resource configured for a downlink or the guard band based on the scheduling information, and when the transmission resource overlaps at least a part of the resource configured for the downlink or the guard band, determining not to transmit the uplink channel.

The method may further include, when the transmission resource does not overlap the resource configured for the downlink or the guard band at all, transmitting the uplink channel based on an uplink-downlink configuration in the time domain and the frequency domain.

The uplink-downlink configuration in the time domain and the frequency domain may be performed through cell-specific information, higher-layer signaling, or a downlink control channel (DCI).

According to an embodiment of the disclosure, a user equipment (UE) in a wireless communication system includes a transceiver, and at least one processor, wherein the at least one processor is configured to receive configuration information for a guard band, determine whether the guard band is activated based on the configuration information, and when the guard band is activated, determine whether to transmit an uplink channel according to an uplink-downlink configuration in a time domain and a frequency domain.

The at least one processor may be further configured to, when the guard band is not activated, determine whether to transmit the uplink channel according to an uplink-downlink configuration of a time division duplex (TDD) system.

The at least one processor may be further configured to receive scheduling information for the uplink channel through higher-layer signaling, determining whether a transmission resource for the uplink channel overlaps at least a part of a resource configured for a downlink or the guard band based on the scheduling information, and when the transmission resource overlaps at least a part of the resource configured for the downlink or the guard band at all, determine not to transmit the uplink channel.

The at least one processor may be further configured to, when the transmission resource does not overlap the resource configured for the downlink or the guard band at all, transmit the uplink channel based on an uplink-downlink configuration in the time domain and the frequency domain.

According to an embodiment of the disclosure, an operating method of a base station (BS) in a wireless communication system includes transmitting configuration information for a guard band to a user equipment (UE), and when the guard band is activated, receiving an uplink channel according to an uplink-downlink configuration in a time domain and a frequency domain, wherein whether the guard band is activated is determined by the UE based on the configuration information.

According to an embodiment of the disclosure, a base station (BS) in a wireless communication system includes a transceiver, and at least one processor, wherein the at least one processor is configured to transmit configuration for a guard band to a user equipment (UE), when the guard band is activated, receive an uplink channel according to an uplink-downlink configuration in a time domain and a frequency domain, and whether the guard band is activated is determined by the UE based on the configuration information.

DETAILED DESCRIPTION

Figure 1:
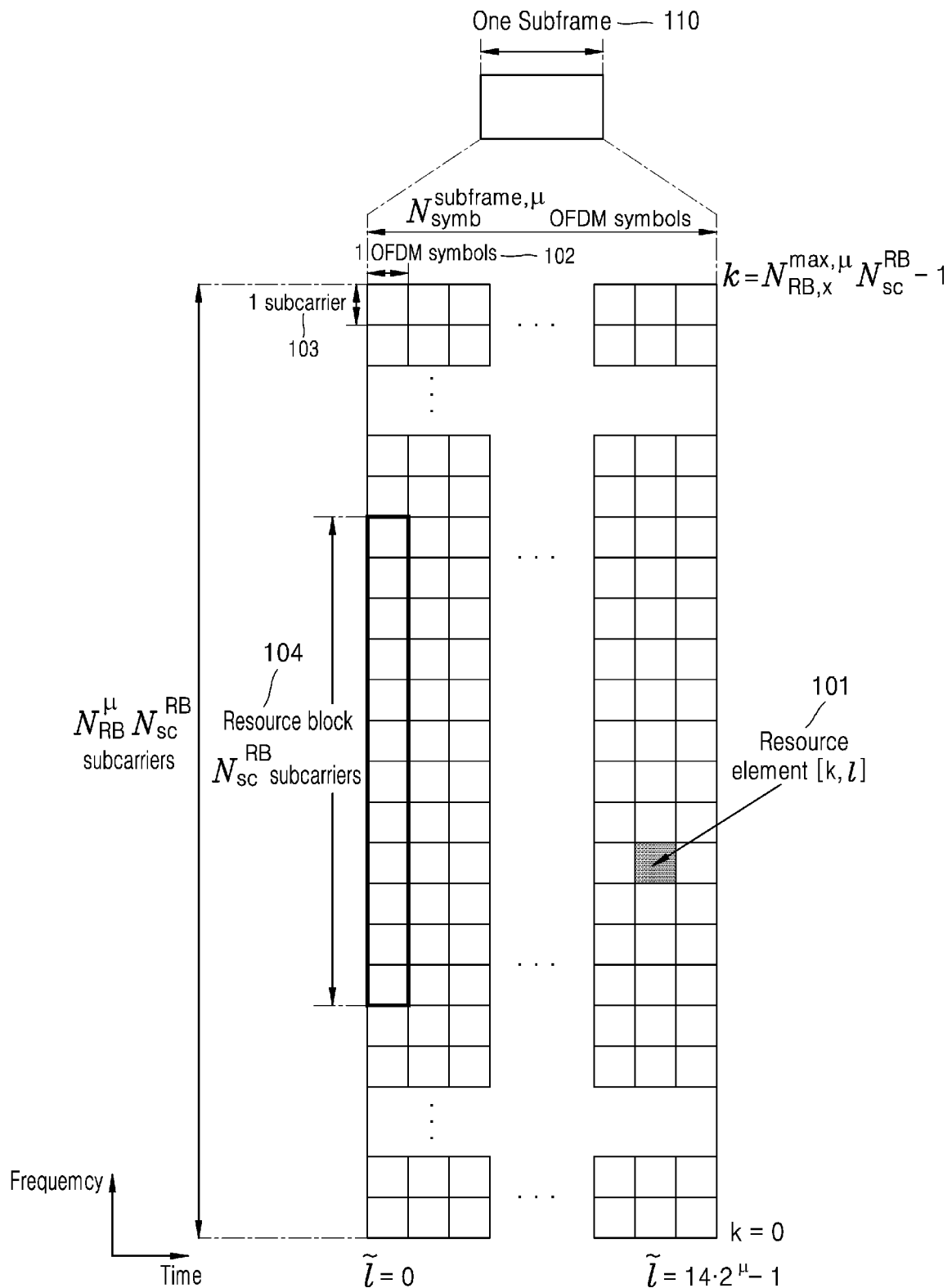
FIG. 1 is a diagram illustrating a basic structure of a time-frequency domain that is a radio resource domain of a 5th generation (5G) system, according to an embodiment of the disclosure.

Hereinafter, embodiments of the disclosure will be described with reference to accompanying drawings.

In the following descriptions of embodiments, descriptions of techniques that are well known in the art and are not directly related to the disclosure are omitted. This is to more clearly convey the gist of the disclosure by omitting unnecessary description.

For the same reasons, components may be exaggerated, omitted, or schematically illustrated in drawings for clarity. The size of each component does not entirely reflect the actual size thereof. The same reference numerals are assigned to the same or corresponding elements in the drawings.

The advantages and features of the disclosure and methods of achieving them will become apparent with reference to embodiments of the disclosure described in detail below with reference to the accompanying drawings. However, the disclosure is not limited to the embodiments disclosed below, but may be embodied in different forms, the embodiments are provided to enable a complete disclosure and to fully convey the scope of the disclosure to one of ordinary skill in the art, and the disclosure may be defined by the scope of the claims. The same reference numerals refer to the same components throughout the specification. In the description of the disclosure, when it is determined that a detailed description of related functions or configurations may unnecessarily obscure the subject matter of the disclosure, the detailed description will be omitted. Terms to be described below should be defined in consideration of functions of the disclosure but may be variable depending on the intention of users or operators, practices, or the like. Therefore, the terms should be defined based on the whole context of the disclosure.

Hereinafter, the term "base station" refers to an entity for allocating resources to a user equipment (UE) and may be used interchangeably with at least one of a gNode B, an eNode B, a node B, a base station (BS), a radio access unit, a base station controller, or a node over a network. Examples of a terminal may include a user equipment (UE), a mobile station (MS), a cellular phone, a smartphone, a computer, a multimedia system capable of performing a communication function, or the like. In the disclosure, a downlink (DL) denotes a wireless transmission path of a signal transmitted by a base station to a terminal, and an uplink (UL) denotes a wireless transmission path of a signal transmitted by a terminal to a base station. Also, a long term evolution (LTE) or long term evolution-advanced (LTE-A) system will be described as an example, but the embodiments of the disclosure may also be applied to other communication systems having a similar technical background or channel type. Examples thereof may include 5G mobile communication technologies (e.g., 5G, new radio (NR), etc.) developed after LTE-A. 5G may be a concept including existing LTE, LTE-A, and other similar services. The disclosure is applicable to other communication systems through modification at the discretion of one of ordinary skill in the art without greatly departing from the scope of the disclosure.

In this case, it will be understood that each block of flowchart illustrations and combinations of blocks in the flowchart illustrations may be implemented by computer program instructions. The computer program instructions may be installed in a processor of a general-purpose computer, special-purpose computer, or other programmable data processing equipment, so that means to perform functions described in block(s) of each flowchart may be produced by instructions executed by the processor of the computer or the other programmable data processing equipment. The computer program instructions may be stored in a computer usable or readable memory oriented to a computer or other programmable data processing equipment to implement functions in a particular way. Thus, an article of manufacture, including an instruction means for performing the function described in a block(s) of each flowchart, may be produced by the instructions stored in the computer usable or readable memory. Because the computer program instructions may be stored in a computer or other programmable data processing equipment, the functions of the block(s) of each flowchart may be provided by the instructions performing a series of operations in the computer or the other programmable data processing equipment to produce a process executable by the computer to generate a computer programmable instructions to operate the computer or the other data processing equipment.

In addition, each block may represent a module, segment, or part of code that includes one or more executable instructions for executing specified logical function(s). It should be noted that in some alternative embodiments of the disclosure, the functions described in the blocks may be performed in an order different from that described herein. For example, two blocks illustrated in succession may in fact be executed substantially concurrently, or the blocks may sometimes be executed in a reverse order, depending on the functions involved therein.

In this case, the term "unit" used in the present embodiment refers to a software or hardware component, such as a field-programmable gate array (FPGA) or an application-specific integrated circuit (ASIC), which performs certain tasks. However, the term "unit" is not limited to software or hardware. The term "unit" may be configured to be stored in an addressable storage medium or to reproduce one or more processors. Thus, the term "unit" may include, for example, components, such as software components, object-oriented software components, class components, and task components, processes, functions, attributes, procedures, subroutines, segments of program code, drivers, firmware, microcode, a circuit, data, database, data structures, tables, arrays, and parameters. Components and functions provided in "units" may be combined to a smaller number of components and "units" or may be divided into sub-components and "sub-units". In addition, the components and "units" may be implemented to execute one or more CPUs in a device or a secure multimedia card. Also, according to an embodiment, a "unit" may include one or more processors.

Hereinafter, embodiments of the disclosure will be described in detail with reference to the accompanying drawings. Although a method and apparatus provided as an embodiment of the disclosure are described as an example of a service for improving coverage, the disclosure is not limited thereto and a method of transmitting and receiving a data channel, a control channel, and a reference signal corresponding to other additional services may be used by using a combination of all or some embodiments of the disclosure. Accordingly, embodiments of the disclosure may be applied through partial modification without departing from the scope of the disclosure according to the determination by one of ordinary skill in the art.

In the description of the disclosure, when it is determined that a detailed description of related functions or configurations may unnecessarily obscure the subject matter of the disclosure, the detailed description will be omitted. Terms to be described below should be defined in consideration of functions of the disclosure but may be variable depending on the intention of users or operators, practices, or the like. Therefore, the terms should be defined based on the whole context of the disclosure.

A wireless communication system has evolved from a system providing voice-oriented services to a broadband wireless communication system providing high speed high quality packet data services of communication standards such as high speed packet access (HSPA) of 3GPP, LTE or evolved universal terrestrial radio access (E-UTRA), LTE-A, LTE-Pro, high rate packet data (HRPD) of 3GPP2, ultra mobile broadband (UMB), and IEEE 802.16e.

An LTE system, which is a representative example of a broadband wireless communication system, employs an orthogonal frequency division multiplexing (OFDM) scheme for a DL, and employs a single carrier frequency division multiple access (SC-FDMA) scheme for an UL. The term 'uplink' refers to a radio link through which a terminal (e.g., a user equipment (UE) or a mobile station (MS)) transmits data or a control signal to a base station (e.g., an eNode B (eNB) or a BS), and the term 'downlink' refers to a radio link through which a base station transmits data or a control signal to a terminal. In the multi-access scheme described above, time-frequency resources for carrying data or control information are allocated and operated in a manner to prevent overlapping of the resources, i.e., to establish orthogonality between users so as to identify data or control information of each user.

As future communication systems after LTE, 5G communication systems should be able to freely reflect various requirements of users and service providers, and thus services simultaneously satisfying the various requirements should be supported. Services considered for 5G communication systems include enhanced mobile broadband (eMBB), massive machine type communication (mMTC), and ultra-reliable low-latency communication (URLLC).

eMBB aims to provide a data rate that is higher than that supported by LTE, LTE-A, or LTE-Pro. For example, in a 5G communication system, eMBB should be able to provide a peak data rate of 20 gigabits per second (Gbps) in a downlink and a peak data rate of 10 Gbps in an uplink with respect to one base station. Also, the 5G communication system should be able to provide an increased user-perceived data rate of a terminal while providing the peak data rate. In order to satisfy such requirements, in the 5G communication system, various transmission and reception technologies including a further enhanced MIMO transmission technology need to be improved. Also, an LTE system transmits a signal by using a maximum transmission bandwidth of 20 megahertz (MHz) in a frequency band of 2 gigahertz (GHz). In contrast, the 5G communication system transmits a signal by using a frequency bandwidth wider than 20 MHz in a frequency band of 3 to 6 GHz or more, and thus may satisfy the data rate requirements necessary for the 5G communication system.

Furthermore, mMTC is considered to support application services such as Internet of Things (IoT) in a 5G communication system. In order to efficiently provide the IoT, the mMTC is required to support access to a large number of terminals in a cell, improved battery time, cost reduction of a terminal, etc. The IoT needs to be able to support a large number of terminals (e.g., 1,000,000 terminals/km2) in a cell because it is attached to various sensors and various devices to provide communication functions. Also, because a terminal supporting the mMTC is likely to be located in a shaded area not covered by a cell such as an underground of a building due to nature of services, the terminal requires a wider coverage than other services provided by the 5G communication system. The terminal supporting the mMTC should be an inexpensive terminal, and because it is difficult to frequently replace a battery of the terminal, the terminal requires a very long battery lifetime (e.g., 10 to 15 years).

Lastly, URLLC is a cellular-based wireless communication service used for mission-critical purposes. For example, the URLLC may be used in remote control of robots or machinery, industrial automation, unmanned aerial vehicles, remote health care, emergency alert, etc. Accordingly, communication provided by the URLLC should provide very low latency (ultra-low latency) and very high reliability (ultra-high reliability). For example, a service supporting the URLLC should meet an air interface latency of less than 0.5 milliseconds and have a packet error rate of 10-5 or less. Accordingly, for a service supporting the URLLC, the 5G system should provide a transmission time interval (TTI) less than that of other services, and a design for broad resource allocation in a frequency band in order to ensure the reliability of a communication link.

Three services considered for the 5G communication system (hereinafter, interchangeably used with 5G system), that are, eMBB, URLLC, and mMTC, may be multiplexed and transmitted in one system. In this case, in order to satisfy different requirements of the services, different transmission and reception schemes and different transmission and reception parameters may be used between the services.

A frame structure of a 5G system will now be described in more detail with reference to the drawings.

FIG. 1 is a diagram illustrating a basic structure of a time-frequency domain that is a radio resource domain of a 5G system, according to an embodiment of the disclosure.

In FIG. 1, the horizontal axis represents a time domain and the vertical axis represents a frequency domain. A basic resource unit in the time-frequency domain is a resource element (RE) 101 and may be defined by one OFDM symbol (or discrete Fourier transform spread OFDM (DFT-s-OFDM) symbol) 102 in a time axis and one subcarrier 103 in a frequency axis. $N_{SC}^{RB}$ (e.g., 12) consecutive REs in the frequency domain may configure one resource block (RB) 104. Also, in the time domain, $N_{symb}^{subframe}$ consecutive OFDM symbols may constitute one subframe 110.

Figure 2:
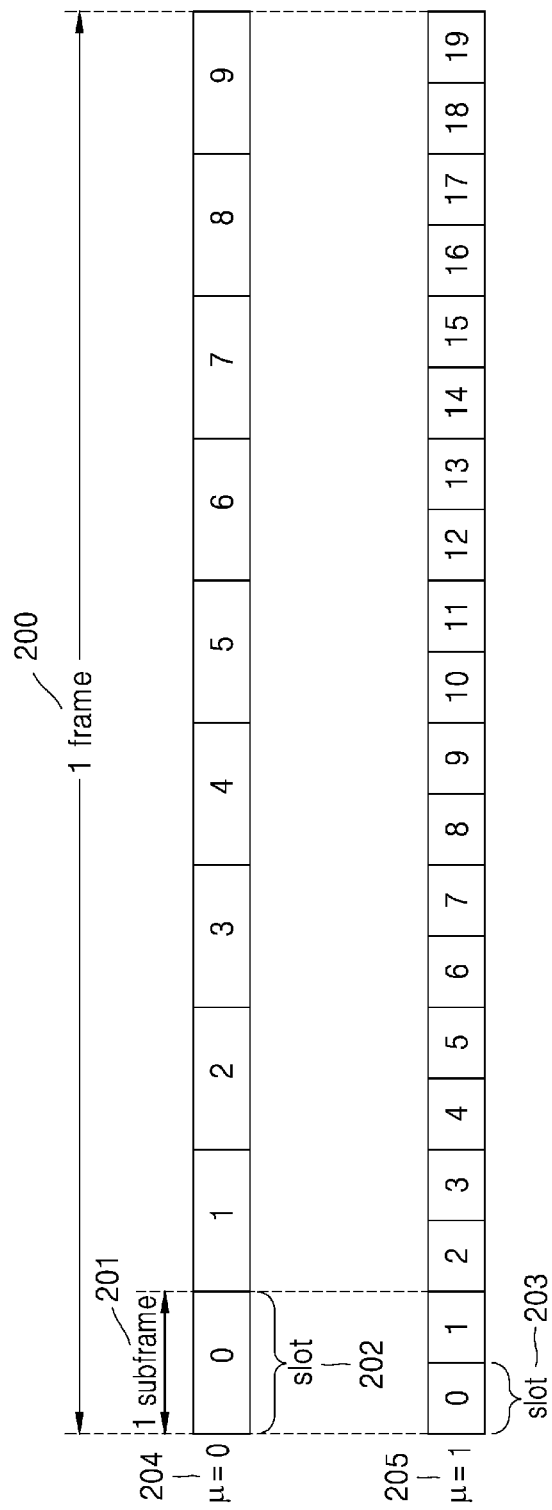
FIG. 2 is a diagram illustrating a slot structure considered for a 5G system, according to an embodiment of the disclosure.

FIG. 2 is a diagram illustrating a slot structure considered for a 5G system, according to an embodiment of the disclosure.

In FIG. 2, structures of a frame 200, a subframe 201, and slots 202 are illustrated. One frame 200 may be defined as 10 ms. One subframe 201 may be defined as 1 ms, and thus, one frame 200 may include a total of 10 subframes 201. Also, one slot 202 and 203 may be defined as 14 OFDM symbols (i.e., the number of symbols per slot ($N_{symb}^{slot}$=14). The one subframe 201 may include one or multiple slots 202 and 203, and the number of slots 202 and 203 per 1 subframe 201 may vary depending on subcarrier spacing configuration values µ 204 and 205.

FIG. 2 illustrates a slot structure in a case where the subcarrier spacing configuration value µ is 0 (204) and a case where the subcarrier configuration value µ is 1 (205). When µ=0 (204), one subframe 201 may include one slot 202, and when µ=1 (205), one subframe 201 may include two slots 203. That is, the number of slots per subframe ($N_{slot}^{subframe,\mu}$) may vary according to the subcarrier spacing configuration value µ, and the number of slots per frame ($N_{slot}^{frame,\mu}$) may accordingly vary $N_{slot}^{subframe,\mu}$ and $N_{slot}^{frame,\mu}$ according to each subcarrier spacing configuration µ may be defined as in [Table 1] below.

TABLE 1

| µ | $N_{symb}^{slot}$ | $N_{slot}^{frame, \mu}$ | $N_{slot}^{subframe, \mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In a 5G wireless communication system, a synchronization signal block (interchangeably used with SSB, SS block, SS/PBCH block, etc.) may be transmitted for initial access, and the SSB may include a primary synchronization signal (PSS), a secondary synchronization signal (SSS), and a physical broadcast channel (PBCH). At an initial access step in which a UE first accesses the system, the UE may first obtain synchronization of DL time and frequency domains based on a synchronization signal through cell search and obtain cell identification (ID). The synchronization signal may include a PSS and a SSS. In addition, the UE may receive, from the BS, a PBCH in which a master information block (MIB) is transmitted, and obtain system information related to a system bandwidth or related control information, such as a system bandwidth or related control information, and a basic parameter value. Based on the information, the UE may decode a physical downlink control channel (PDCCH) and a physical downlink shared channel (PDSCH) and obtain a system information block (SIB). Thereafter, in a random access step, the UE initially accesses a network by exchanging an identity with the BS and through registration and authentication steps.

Hereinafter, a procedure for cell initial access operation of a 5G wireless communication system is described in greater detail.

A synchronization signal is a signal which serves as a reference for cell search, and may be transmitted by having applied thereto a subcarrier spacing appropriate for a channel environment, such as phase noise, for each frequency band. A 5G BS may transmit a plurality of SSBs according to the number of analog beams to be operated. The PSS and the SSS may be mapped and transmitted over twelve RBs, and the PBCH may be mapped and transmitted over twenty-four RBs. Hereinafter, a structure in which a synchronization signal and a PBCH are transmitted in a 5G communication system is described.

Figure 3:
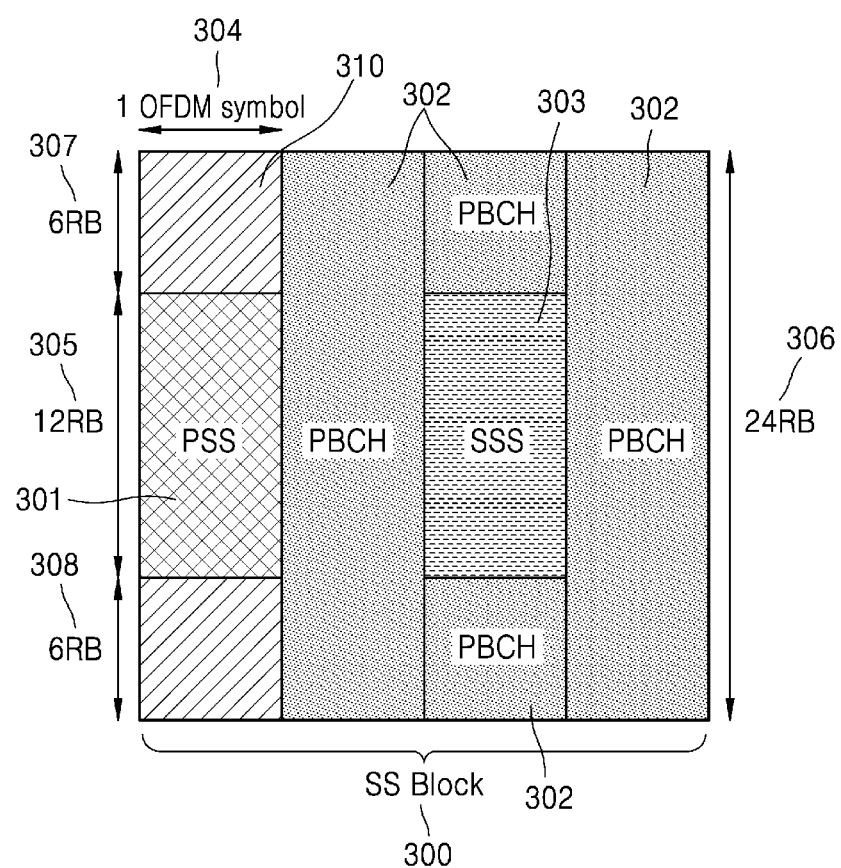
FIG. 3 is a diagram illustrating a synchronization signal block (SSB) considered for a 5G communication system, according to an embodiment of the disclosure.

FIG. 3 is a diagram illustrating an SSB considered for a 5G communication system according to an embodiment of the disclosure.

Referring to FIG. 3, an SSB 300 may include a PSS 301, an SSS 303, and a PBCH 302.

As shown, the SSB 300 may be mapped to four OFDM symbols on a time axis. The PSS 301 and the SSS 303 may be transmitted in twelve RBs 305 on a frequency axis and respectively in first and third OFDM symbols on the time axis. In a 5G system, a total of 1008 different cell identities (IDs) may be defined, and according to a physical-layer ID of a cell, the PSS 301 may have three different values and the SSS 303 may have 336 different values. The UE may obtain one of the 1008 cell IDs through the detection and combination of the PSS 301 and the SSS 303. This may be expressed by Equation 1 below.

$$N_{ID}^{cell}=3N_{ID}^{(1)}+N_{ID}^{(2)}$$ [Equation 1]

In [Equation 1], N(1)ID may be estimated from the SSS 303 and have a value between 0 and 335. N(2)ID may be estimated from the PSS 301 and have a value between 0 and 2. NcellID, which is a cell ID, may be estimated from a combination of N(1)ID and N(2)ID.

The PBCH 302 may be transmitted in a resource including 24 RBs on the frequency axis and 6 RBs, on the time axis, except for 6 RBs at opposite sides excluding 12 RBs in the middle in which the SSS 303 is transmitted, of second to fourth OFDM symbols of the SSB. Various system information called MIB may be transmitted in the PBCH 302, and more specifically, the MIB includes information as in [Table 2] below, and a PBCH payload and a PBCH demodulation reference signal (DMRS) include additional information as below.

TABLE 2

| MIB ::= | SEQUENCE { |
| --- | --- |
| systemFrameNumber | BIT STRING (SIZE (6)), |
| subCarrierSpacingCommon | ENUMERATED {scs15or60, scs30or120}, |
| ssb-SubcarrierOffset | INTEGER (0.. 15), |
| dmrs-TypeA-Position | ENUMERATED {pos2, pos3}, |
| pdcch-ConfigSIB1 | PDCCH-ConfigSIB1, |
| cellBarred | ENUMERATED {barred, notBarred}, |
| intraFreqReselection | ENUMERATED {allowed, notAllowed}, |
| spare | BIT STRING (SIZE (1)) |
| } | |

SSB Information: an offset of a frequency domain of an SSB is indicated through 4 bits (ssb-SubcarrierOffset) in the MIB. An index of the SSB including the PBCH may be indirectly obtained by decoding the PBCH DMRS and the PBCH. More specifically, in a frequency band of 6 GHz or less, 3 bits obtained by decoding the PBCH DMRS indicate an SSB index, and in a frequency band of 6 GHz or greater, 3 bits obtained by decoding the PBCH DMRS and 3 bits included in the PBCH payload and obtained by decoding the PBCH, i.e., a total of 6 bits, indicate an SSB index including the PBCH.

Physical Downlink Control Channel (PDCCH) information: A subcarrier spacing of a common DL control channel is indicated through 1 bit (subCarrierSpacing-Common) in the MIB, and time-frequency resource configuration information of a control resource set (CORESET) and a search space (SS) is indicated through 8 bits (pdcch-ConfigSIB1).

System Frame Number (SFN): 6 bits in the MIB are used to indicate a part of the SFN. Least Significant Bits (LSBs), e.g., 4 bits, of the SFN may be included in the PBCH payload and indirectly obtained by the PBCH decoding.

Timing information in a radio frame: The UE may indirectly identify whether an SSB is transmitted in a first or second half frame of the radio frame by using the above-described SSB index and 1 bit (a half frame) included in the PBCH payload and obtained through the PBCH decoding.

Because transmission bandwidths 305 (12 RBs) of the PSS 301 and the SSS 303 and a transmission bandwidth 306 (24 RBs) of the PBCH 302 are different from each other, 6 RBs 307 and 308 may be present at both sides of the first OFDM symbol in which the PSS 301 is transmitted within the transmission bandwidth of the PBCH 302, except for 6 RBs 307 and 308 in the middle in which the PSS 301 is transmitted. The area may be used to transmit other signals or may be empty.

The SSB may all be transmitted by using the same analog beam. That is, the PSS 301, the SSS 303, and the PBCH 302 may all be transmitted with the same beam. An analog beam cannot be differently applied in terms of a frequency axis, and thus, the same analog beam is applied to all RBs on the frequency axis within a certain OFDM symbol to which a certain analog beam is applied. That is, all four OFDM symbols in which the PSS 301, the SSS 303, and the PBCH 302 are transmitted may be transmitted by using the same analog beam.

Figure 4:
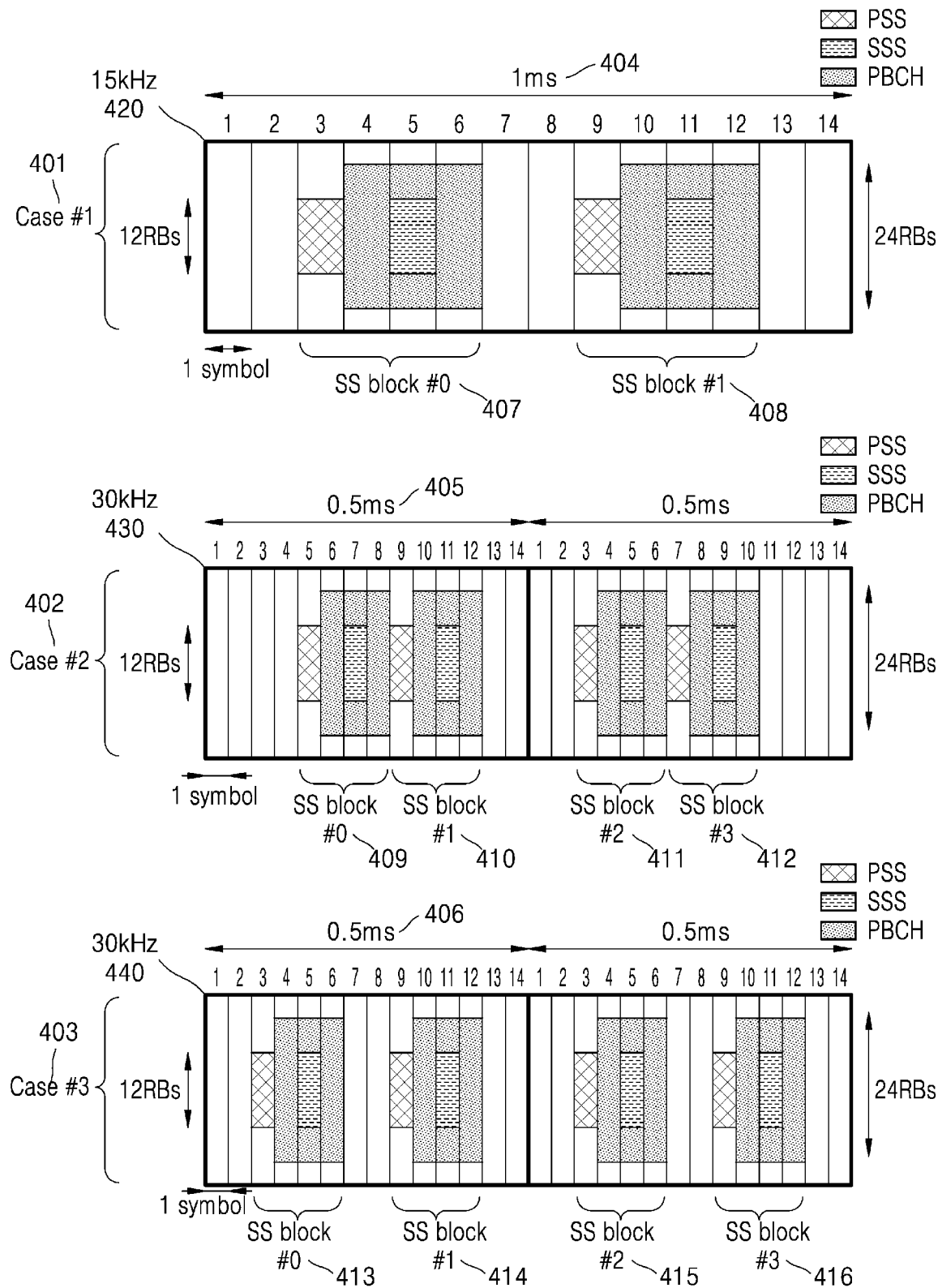
FIG. 4 is a diagram illustrating cases of transmission of an SSB in a frequency band of 6 GHz or less, considered for a 5G communication system, according to an embodiment of the disclosure.

FIG. 4 is a diagram illustrating cases of transmission of an SSB in a frequency band of 6 GHz or less, considered for a 5G communication system, according to an embodiment of the disclosure.

Referring to FIG. 4, in a frequency band of 6 GHz or less in a 5G communication system, a subcarrier spacing (SCS) of 15 kHz 420 and an SCS of 30 kHz 430 and 440 may be used in SSB transmission. There may be one SSB transmission case (case #1 401) at the subcarrier spacing of 15 kHz, and there may be two SSB transmission cases (case #2 402 and case #3 403) at the subcarrier spacing of 30 kHz.

In case #1 401 at the subcarrier spacing 420 of 15 kHz, two SSBs or less may be transmitted within a time of 1 ms 404 (corresponding to the length of one slot when one slot consists of 14 OFDM symbols). In the example of FIG. 4, an SS block #0 407 and an SS block #1 408 are illustrated. In this case, the SS block #0 407 may be mapped to four consecutive symbols from a third OFDM symbol, and the SS block #1 408 may be mapped to four consecutive symbols from a ninth OFDM symbol.

Different analog beams may be applied to the SS block #0 407 and the SS block #1 408. Therefore, the same beam may be applied to all third to sixth OFDM symbols to which the SS block #0 407 is mapped, and the same beam may be applied to all ninth to twelfth OFDM symbols to which the SS block #1 408 is mapped. A beam to be applied to seventh, eighth, thirteenth, and fourteenth OFDM symbols to which no SSB is mapped may be freely determined by aBS.

In case #2 402 at the SCS 430 of 30 kHz, two SSBs or less may be transmitted within a time of 0.5 ms 405 (corresponding to the length of one slot when one slot consists of 14 OFDM symbols), and thus, four or less SSBs may be transmitted within a time of 1 ms (corresponding to the length of two slots when one slot consists of 14 OFDM symbols). It is illustrated in the example of FIG. 4 that the SS block #0 409, the SS block #1 410, the SS block #2 411, and the SS block #3 412 are transmitted within 1 ms (i.e., two slots). In this case, the SS block #0 409 and the SS block #1 410 may be mapped from a fifth OFDM symbol and a ninth OFDM symbol of a first slot, respectively, and the SS block #2 411 and the SS block #3 412 may be mapped from a third OFDM symbol and a seventh OFDM symbol of a second slot, respectively.

Different analog beams may be applied to the SS block #0 409, the SS block #1 410, the SS block #2 411, and the SS block #3 412. Accordingly, the same analog beam may be applied to each of fifth to eighth OFDM symbols of a first slot in which the SS block #0 409 is transmitted, ninth to twelfth OFDM symbols of a first slot in which the SS block #1 410 is transmitted, third to sixth symbols of a second slot in which the SS block #2 411 is transmitted, and seventh to tenth symbols of a second slot in which the SS block #3 412 is transmitted. A beam to be applied to OFDM symbols to which no SSB is mapped may be freely determined according to a decision of the BS.

In case #3 403 at the SCS 440 of 30 kHz, two SSBs or less may be transmitted within a time of 0.5 406 (corresponding to the length of one slot when one slot consists of fourteen OFDM symbols), and thus, four or less SSBs may be transmitted within a time of 1 ms (corresponding to the length of two slots when one slot consists of fourteen OFDM symbols). It is illustrated in the example of FIG. 4 that the SS block #0 413, the SS block #1 414, the SS block #2 415, and the SS block #3 416 are transmitted within 1 ms (i.e., two slots). In this case, the SS block #0 413 and the SS block #1 414 may be mapped from a third OFDM symbol and a ninth OFDM symbol of a first slot, respectively, and the SS block #2 415 and the SS block #3 416 may be mapped from a third OFDM symbol and a ninth OFDM symbol of a second slot, respectively.

Different analog beams may be used for the SS block #0 413, the SS block #1 414, the SS block #2 415, and the SS block #3 416. As described above, the same analog beam may be used for all four OFDM symbols in which each SSB is transmitted, and a beam to be used for OFDM symbols to which no SSB is mapped may be freely determined by the BS.

Figure 5:
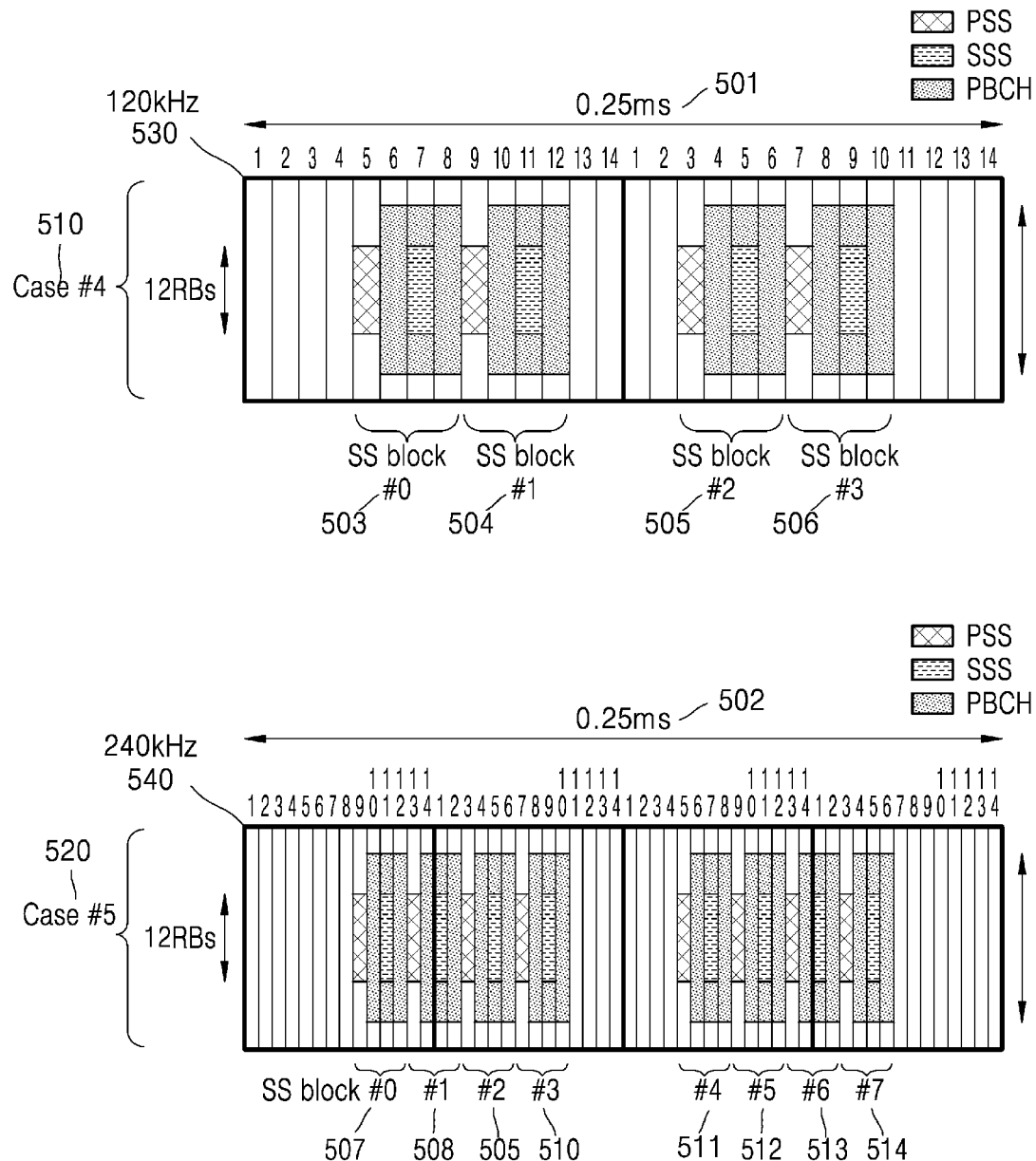
FIG. 5 is a diagram illustrating cases of transmission of an SSB in a frequency band 6 GHz or greater, considered for a 5G communication system, according to an embodiment of the disclosure.

FIG. 5 is a diagram illustrating cases of transmission of an SSB in a frequency band of 6 GHz or greater, considered for a 5G communication system, according to an embodiment of the disclosure.

Referring to FIG. 5, in a 5G communication system, in a frequency band of 6 GHz or greater, an SCS of 120 kHz 530 and an SCS of 240 kHz 540 may be used to transmit SSBs.

In case #4 510 at an SCS of 120 kHz 530, four or less SSBs may be transmitted within a time of 0.25 ms 501 (corresponding to the length of two slots when one slot consists of fourteen OFDM symbols). It is illustrated in the example of FIG. 5 that the SS block #0 503, the SS block #1 504, the SS block #2 505, and the SS block #3 506 are transmitted within 0.25 ms (i.e., two slots). In this case, the SS block #0 503 and the SS block #1 504 may be mapped from a fifth OFDM symbol and a ninth OFDM symbol of a first slot, respectively, and the SS block #2 505 and the SS block #3 506 may be mapped from a third OFDM symbol and a seventh OFDM symbol of a second slot, respectively.

As described above, different analog beams may be used for the SS block #0 503, the SS block #1 504, the SS block #2 505, and the SS block #3 506. The same analog beam may be used for all four OFDM symbols in which each SSB is transmitted, and a beam to be used for OFDM symbols to which no SSB is mapped may be freely determined by the BS.

In case #5 520 at an SCS of 240 kHz 540, eight or less SSBs may be transmitted within a time of 0.25 ms 502 (corresponding to the length of four slots when one slot consists of fourteen OFDM symbols). In the example of FIG. 5, it is shown that the SS block #0 507, the SS block #1 508, the SS block #2 509, the SS block #3 510, the SS block #4 511, the SS block #5 512, the SS block #6 513, and the SS block #7 514 are transmitted in 0.25 ms (i.e., four slots). In this case, the SS block #0 507 and the SS block #1 508 may be mapped from the ninth OFDM symbol and a thirteenth OFDM symbol of the first slot, respectively, the SS block #2 509 and the SS block #3 510 may be mapped from a third OFDM symbol and a seventh OFDM symbol of the second slot, respectively, the SS block #4 511, the SS block #5 512, and the SS block #6 513 may be mapped from a fifth OFDM symbol, a ninth OFDM symbol, and a thirteenth OFDM symbol of a third slot, respectively, and the SS block #7 514 may be mapped from a third OFDM symbol of a fourth slot.

As described above, different analog beams may be used for the SS block #0 507, the SS block #1 508, the SS block #2 509, the SS block #3 510, the SS block #4 511, the SS block #5 512, the SS block #6 513, and the SS block #7 514. The same analog beam may be used for all four OFDM symbols in which each SSB is transmitted, and a beam to be used for OFDM symbols to which no SSB is mapped may be freely determined by the BS.

Figure 6:
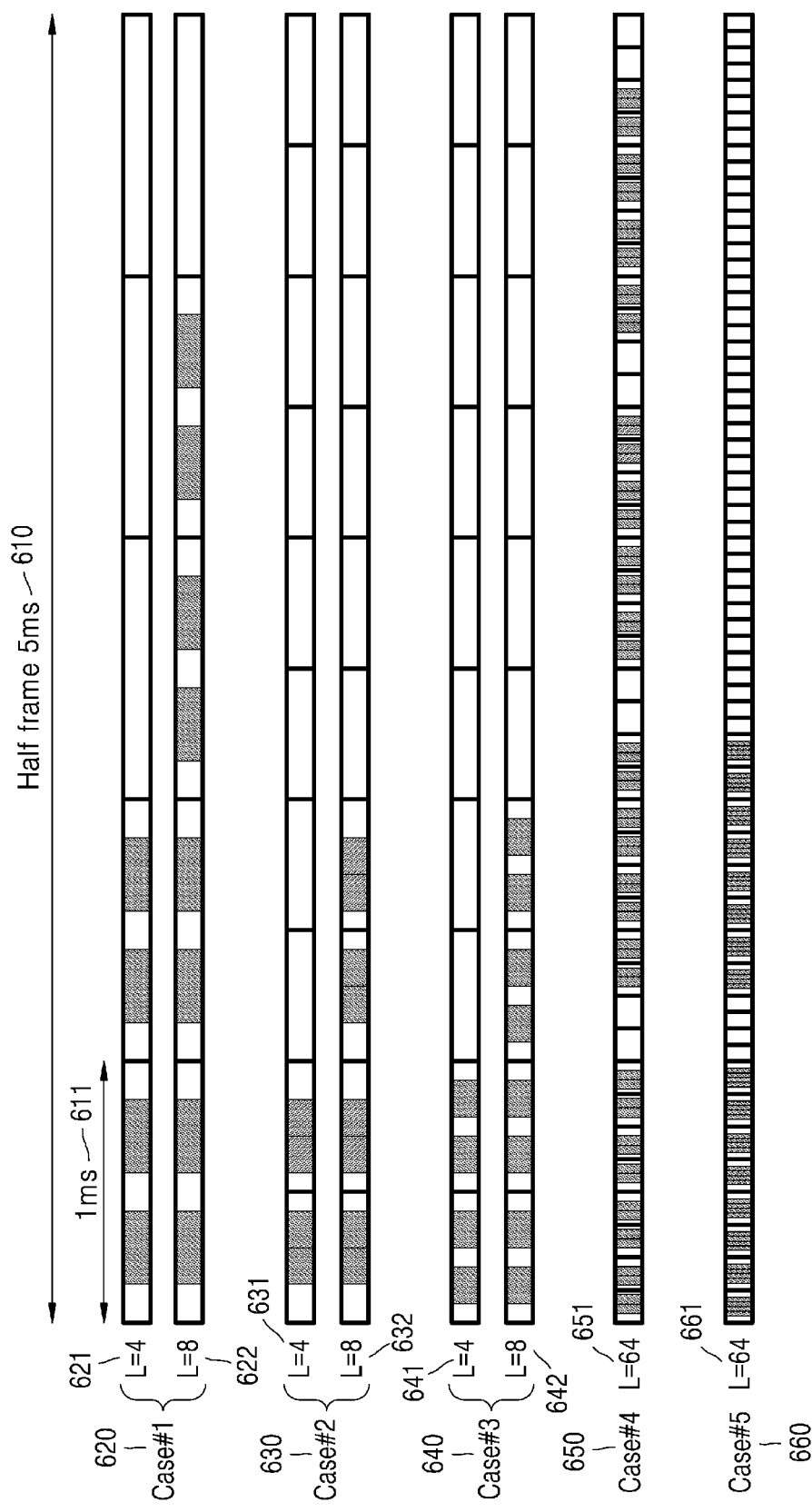
FIG. 6 is a diagram illustrating cases of transmission of an SSB according to a subcarrier spacing (SCS) within a time of 5 ms, according to an embodiment of the disclosure.

FIG. 6 is a diagram illustrating SSB transmission cases according to an SCS within 5 ms according to an embodiment of the disclosure.

In the 5G communication system, an SSB may be periodically transmitted in units of 5 ms 610 (corresponding to five subframes or a half frame).

In a frequency band of 3 GHz or less, up to four SSBs may be transmitted within a time of 5 ms 610. Up to eight SSBs may be transmitted in a frequency band of 3 GHz or greater and 6 GHz or less. Up to sixty-four SSBs may be transmitted in a frequency band 6 GHz or greater. As described above, the SCSs of 15 kHz and 30 kHz may be used at frequencies of 6 GHz or less.

In the example of FIG. 6, case #1 401 at an SCS of 15 kHz consisting of one slot of FIG. 4 may be mapped to a first slot and a second slot in a frequency band of 3 GHz or less and thus up to four SSBs 621 may be transmitted, and may be mapped to the first, second, third, and fourth slots in a frequency band of 3 GHz or greater and 6 GHz or less and thus up to eight SSBs 622 may be transmitted. Case #2 402/case #3 403 at an SCS of 30 kHz consisting of two slots of FIG. 4 may be mapped starting from a first slot in a frequency band of 3 GHz or less and thus up to four SSBs 631 and 604 may be transmitted, and may be mapped starting from first and third slots in a frequency band of 3 GHz or greater and 6 GHz or less and thus up to eight SSBs 632 and 642 may be transmitted.

SCSs 120 kHz and 240 kHz may be used at frequencies at 6 GHz or greater. In the example of FIG. 6, case #4 510 at an SCS of 120 kHz consisting of two slots may be mapped in a frequency band of 6 GHz or greater starting from 1st, 3rd, 5th, 7th, 11th, 13th, 15th, 17th, 21st, 23rd, 25th, 27th, 31st, 33rd, 35th, and 37th slots, and thus, up to sixty-four SSBs 651 may be transmitted. In the example of FIG. 6, case #5 520 at an SCS of 240 kHz consisting of four slots of FIG. 5 may be mapped in a frequency band of 6 GHz or greater starting from 1st, 5th, 9th, 13rd, 21st, 25th, 29th, and 33rd slots and thus up to sixty-four SSBs 661 may be transmitted.

Actually transmitted SSB indication information included in a system is described in detail below, with reference to FIG. 7. As described above, the actually transmitted SSB indication information may be obtained from system information called SIB or obtained through higher-layer signaling. The actually transmitted SSB indication information included in the system information may be indicated in 8 bits to express whether up to 8 SSBs is transmitted, in a frequency band 6 GHz or less, and may be indicated in a total of 16 bits to express whether a total of 64 SSBs 710 are transmitted, in a frequency band of 6 GHz or greater. More specifically, in a frequency band of 6 GHz or less, one bit may indicate whether one SSB is transmitted. When a first most significant bit (MSB) is 1, it may indicate that a first SSB is actually transmitted by a BS, and when the first MSB is 0, it indicates that the first SSB is not transmitted by the BS.

Figure 7:
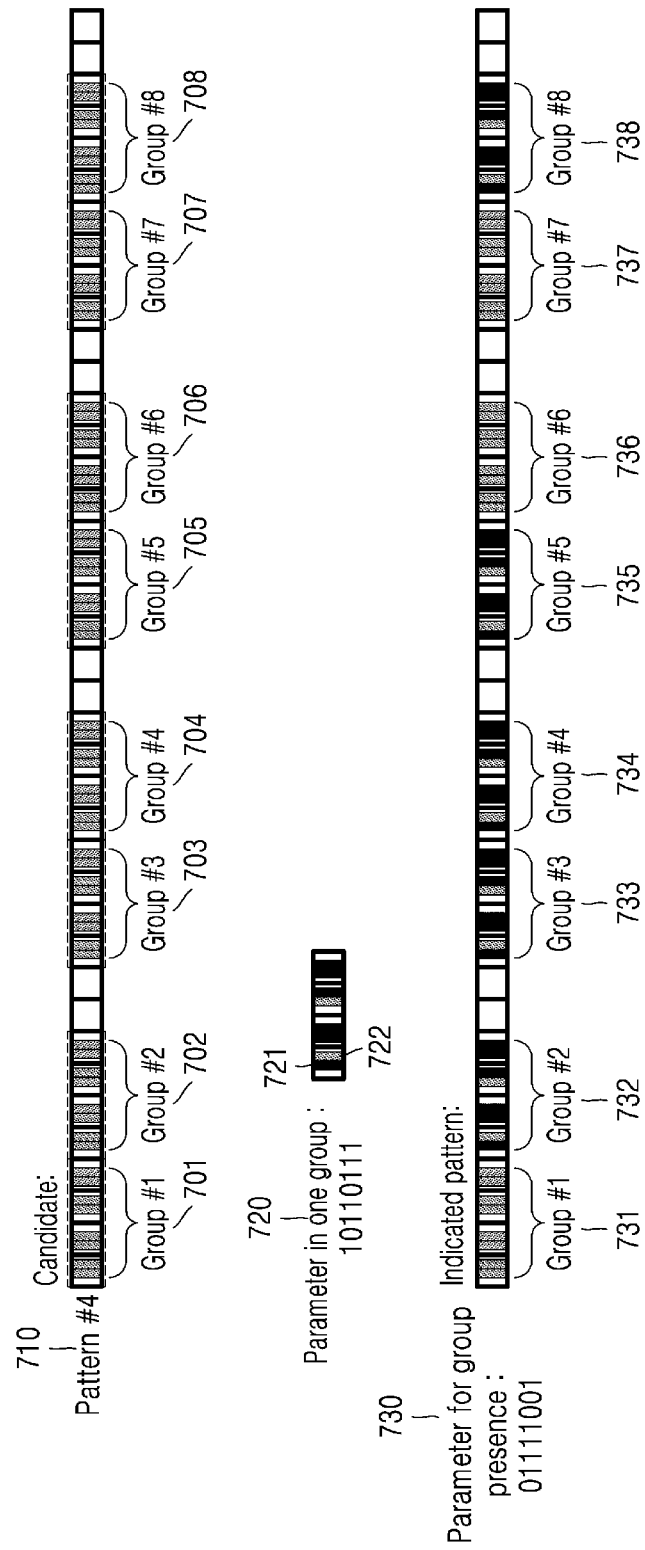
FIG. 7 is a diagram illustrating SSB information actually transmitted in system information from a 5G communication system according to an embodiment of the disclosure.

FIG. 7 is a diagram illustrating SSB information actually transmitted on system information in a 5G communication system according to an embodiment of the disclosure.

That is, FIG. 7 is a diagram illustrating a concrete example of a case in which an SSB is transmitted at a subcarrier of 120 kHz in a frequency band of 6 GHz or greater.

Referring to FIG. 7, in order to represent whether up to 64 SSBs are transmitted in a frequency band of 6 GHz or greater, the 64 SSBs may be grouped into eight groups 701, 702, 703, 704, 705, 706, 707, and 708 each including eight SSBs. Accordingly, a total of 16 bits, e.g., 8 bits 720 indicating whether eight SSBs of one group are transmitted and 8 bits 730 indicating the presence or absence of eight groups, may be represented. 8 bits 720 indicating whether SSBs of one group are transmitted represent one pattern 720 (e.g., 8 bits), identical to that at the above-described frequency band of 6 GHz or less. Specifically, when a first MSB is 1, it may indicate that a first SSB is transmitted (721) by the BS. In addition, when a second MSB is 0, it may indicate that a second SSB is not actually transmitted (722) by the BS. Among 8 bits 730 indicating the presence or absence of eight groups, when a first MSB is 0, it may indicate that all eight SSBs of a first group Group #1 731 are not transmitted (e.g., Group #1 731). When a second MSB is 1, it may indicate that eight SSBs of a second group Group #2 732 are transmitted according to the transmission pattern 720 (e.g., 8 bits) of eight consecutive SSBs of one group that is configured. SSB indication information actually transmitted through higher-layer signaling rather than system information may allow 1 bit to represent whether one SSB is transmitted to represent whether up to 64 SSBs are transmitted regardless of a frequency band. For example, the SSB indication information may indicate the presence or absence of a SSB by using a total of 64 bits.

Meanwhile, the UE may perform decoding of PDCCH and PDSCH based on system information included in the received MIB and then obtain an SIB. The SIB may include at least one of an uplink cell bandwidth, a random access parameter, a paging parameter, and a parameter related to uplink power control. The UE may establish a wireless link with the network through a random access process based on synchronization with the network obtained in a cell search process by a cell and system information. For random access, a contention-based scheme or a contention-free scheme may be used. In an initial cell access step, when the UE is to perform a cell selection or a cell re-selection, the contention-based access scheme may be used for the purpose of switching from an RRC IDLE state to an RRC CONNECTED state. The contention-free random access may be used to reconfigure UL synchronization when UL data is reached, in case of a handover, or when measuring a distance.

Hereinafter, a 4-step random access channel (RACH) procedure is described in detail with reference to FIG. 8.

Figure 8:
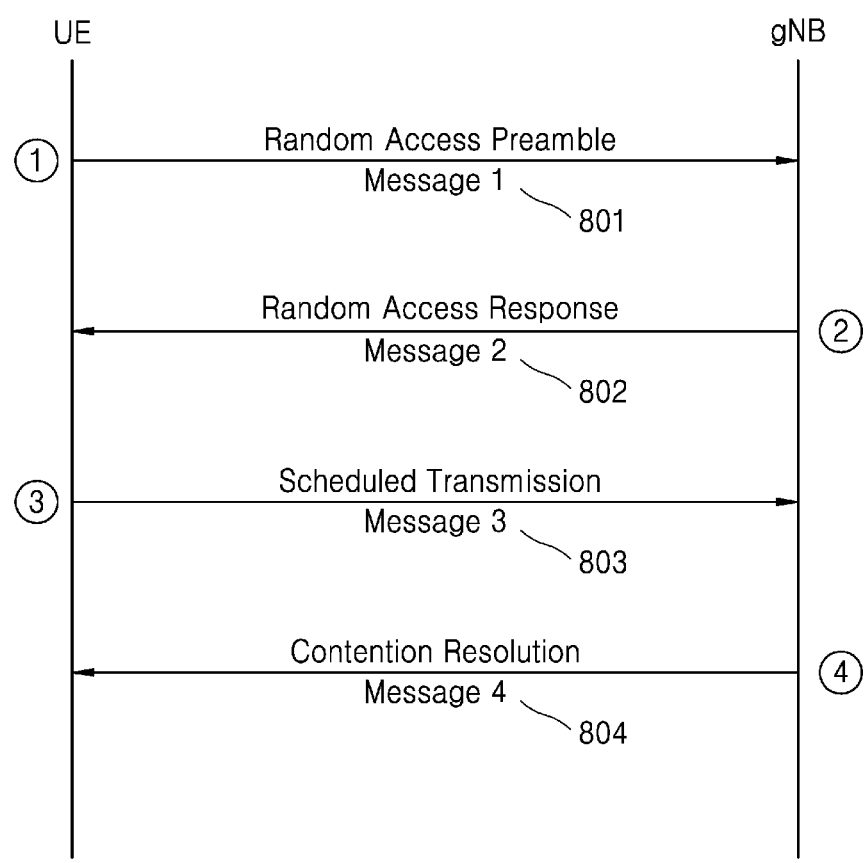
FIG. 8 is a diagram illustrating a 4-step random access procedure according to an embodiment of the disclosure.

FIG. 8 is a diagram illustrating a 4-step RACH procedure according to an embodiment of the disclosure.

Referring to FIG. 8, in a first step 801 of the RACH procedure, a UE transmits a random access preamble (or message 1) to a BS. The BS then measures a transmission latency value between the UE and the BS and perform UL synchronization. At this time, the UE transmits a random access preamble arbitrarily selected in a random access preamble set previously given by the system information. In addition, an initial transmission power of the random access preamble is determined according to a path loss between the BS and the UE measured by the UE. In addition, the UE may determine a direction of a transmission beam (or beam) of the random access preamble based on a synchronization signal (or an SSB) received from the BS and apply the determined transmission beam direction and transmit the random access preamble.

In a second step 802, the BS transmits a response to a detected random access attempt (random access response (RAR) or message 2) to the UE. The BS transmits an UL transmission timing control command to the UE based on a transmission latency value measured from the random access preamble received in the first step. In addition, the BS transmits an UL resource to be used by the UE and a power control command as scheduling information. According to an embodiment, the scheduling information may include control information for an UL transmission beam of the UE. The RAR is transmitted through PDSCH and may include the following information.

Random access preamble sequence index detected by a network (or the BS)
Temporary cell radio network temporary identifier (TC-RNTI)
UL scheduling grant
Timing advance value When the UE does not receive, from the BS, an RAR, which is scheduling information for message 3, for a certain time period in the second step 802, the process returns to the first step 801. When the first step is performed again, the UE increases a transmission power of the random access preamble by a certain step and transmits the random access preamble (this is called "power ramping") so that the probability that the BS will receive the random access preamble is increased.

In the third step 803, the UE transmits UL data (scheduled transmission, or message 3) including the UE identifier thereof to the BS by using the UL resource allocated in the second step 802 through a physical UL shared channel (PUSCH). A transmission timing of the PUSCH for transmitting the message 3 follows the UL transmission timing control command received from the BS in the second step 802. In addition, a transmission power of the PUSCH for transmitting the message 3 is determined in consideration of the power control command received from the BS in the second step 802 and the power ramping value of the random access preamble. The PUSCH for transmitting the message 3 may refer to an initial UL data signal that the UE transmits to the BS after transmitting the random access preamble.

Finally, in a fourth step 804, when it is determined that the UE performs a random access without collision with other UEs, the BS transmits, to the corresponding UE, data (a contention resolution message, or message 4) including an identifier of a UE that transmits UL data in the third step 803. When a signal transmitted by the BS in the fourth step 804 is received, the UE determines that the random access is successful. In addition, the UE transmits a hybrid automatic repeat request acknowledgement/negative-acknowledgement (HARQ-ACK/NACK) indicating whether the message 4 has been successfully received or not, to the BS through a physical uplink control channel (PUCCH).

When the data transmitted by the UE in the third step 803 collides with data of another UE and the BS fails to receive a data signal from the UE, the BS no longer performs data transmission to the UE. Accordingly, when the UE does not receive data which is transmitted in the fourth step 804 from the BS for a certain time interval, the UE determines an RACH failure and the procedure starts from the first step 801 again.

As described above, in the first step 801 of the random access process, the UE may transmit a random access preamble on a physical random access channel (PRACH). Each cell has 64 available preamble sequences, and four long preamble formats and nine short preamble formats may be used according to a form of transmission. The UE generates 64 preamble sequences by using a root sequence index, which is signaled as system information, and a cyclic shift value, and randomly selects one sequence and uses it as a preamble.

The network may inform the UE of a time-frequency resource that may be used as PRACH, by using an SIB or higher signaling. The frequency resource indicates a starting RB point of transmission to the UE, and the number of RBs to be used is determined according to a preamble format and an SCS to be applied. As in [Table 3], the time resource may notify a pre-configured PRACH configuration period, a subframe index including a PRACH transmission time point (interchangeably used with a PRACH occasion and a transmission point), a starting symbol, and the number of PRACH transmission time points within a slot through PRACH configuration indices 0 to 255. The UE may identify time and frequency resources in which the random access preamble is to be transmitted through the PRACH configuration index, random access configuration information included in the SIB, and an index of an SSB selected by the UE, and transmit the selected sequence to the BS as a preamble.

TABLE 3

| PRACH configuration Index | Preamble format | $n_{SFN} \bmod x = y$ | | Subframe number | Starting symbol | Number of PRACH slots within a subframe | number of time-domain PRACH occasions within a PRACH slot | PRACH duration |
|---|---|---|---|---|---|---|---|---|
| | | x | y | | | | | |
| 0 | 0 | 16 | 1 | 1 | 0 | — | — | 0 |
| 1 | 0 | 16 | 1 | 4 | 0 | — | — | 0 |
| 2 | 0 | 16 | 1 | 7 | 0 | — | — | 0 |
| 3 | 0 | 16 | 1 | 9 | 0 | — | — | 0 |
| 4 | 0 | 8 | 1 | 1 | 0 | — | — | 0 |
| 5 | 0 | 8 | 1 | 4 | 0 | — | — | 0 |
| 6 | 0 | 8 | 1 | 7 | 0 | — | — | 0 |
| 7 | 0 | 8 | 1 | 9 | 0 | — | — | 0 |
| 8 | 0 | 4 | 1 | 1 | 0 | — | — | 0 |
| 9 | 0 | 4 | 1 | 4 | 0 | — | — | 0 |
| 10 | 0 | 4 | 1 | 7 | 0 | — | — | 0 |
| ... | | | | | ... | | | |
| 104 | A1 | 1 | 0 | 1, 4, 7 | 0 | 2 | 6 | 2 |
| ... | | | | | ... | | | |
| 251 | C | 1 | 0 | 2, 7 | 0 | 2 | 2 | 6 |
| 252 | C2 | 1 | 0 | 1, 4, 7 | 0 | 2 | 2 | 6 |
| 253 | C2 | 1 | 0 | 0, 2, 4, 6, 8 | 0 | 2 | 2 | 6 |
| 254 | C2 | 1 | 0 | 0, 1, 2, 3, 4, 5, 6, 7, 8, 9 | 0 | 2 | 2 | 6 |
| 255 | C2 | 1 | 0 | 1, 3, 5, 7, 9 | 0 | 2 | 2 | 6 |

Figure 9:
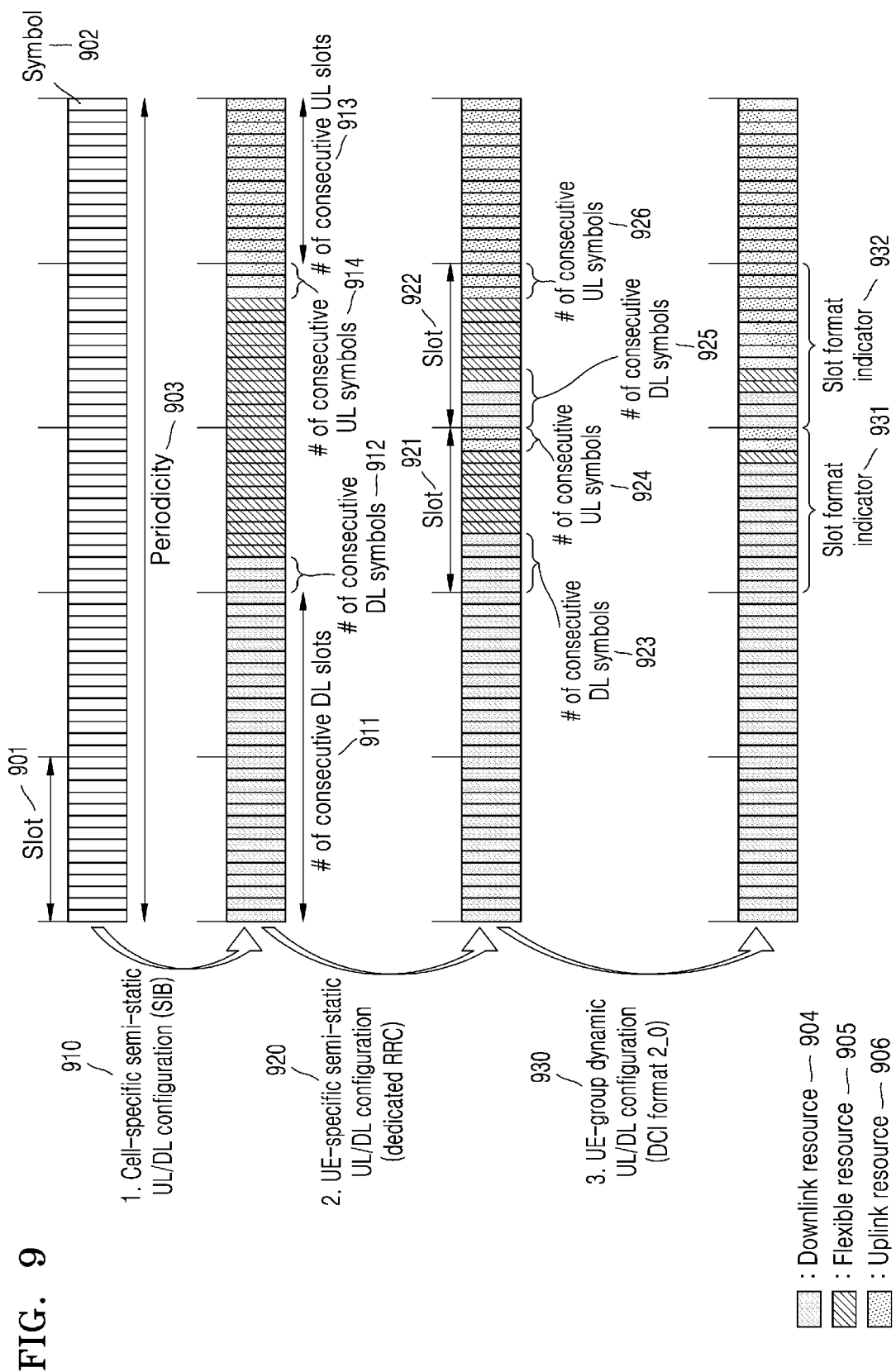
FIG. 9 is a diagram illustrating an uplink-downlink configuration considered for a 5G communication system according to an embodiment of the disclosure.

FIG. 9 is a diagram illustrating a UL-DL configuration considered for a 5G communication system according to an embodiment of the disclosure.

Referring to FIG. 9, a slot 901 may include 14 symbols 902. In the 5G communication system, an UL-DL configuration of a symbol/slot may be configured in three steps. First, an UL-DL of a symbol/slot may be configured semi-statically through cell-specific configuration information 910 through system information in units of symbols. Specifically, the cell-specific UL-DL configuration information through the system information may include UL-DL pattern information and subcarrier information that serves as a reference. In the UL-DL pattern information, a periodicity 903, the number, 911, of consecutive DL slots from a starting point of each pattern, the number, 912, of symbols of a next slot, the number, 913, of consecutive UL slots from the end of the pattern, and the number, 914, of symbols of a next slot may be indicated. At this time, slots and symbols not indicated as UL and DL may be determined as flexible slots/symbols.

Second, through user-specific configuration information through dedicated higher-layer signaling, a flexible slot or slots 921 and 922 including a flexible symbol may be indicated as the number (923 and 925) of consecutive DL symbols from a starting symbol of each slot and the number (924 and 926) of consecutive UL symbols from the end of the slot, or may be indicated as all DL slots or all UL slots.

In addition, finally, in order to dynamically change a DL signal transmission period and an UL signal transmission period, symbols indicated as flexible symbols in each slot (i.e., symbols not indicated as DL and UL) may be indicated as to whether each symbol is a DL symbol, an UL symbol, or a flexible symbol through a slot format indicator (SFI) 931 and 932 included in a DL control channel. In the SFI, one index may be selected from a table in which a UL-DL configuration of 14 symbols within one slot is pre-configured, such as [Table 4] below.

TABLE 4

| Format | \multicolumn{14}{c}{Symbol number in a slot} |
|---|---|---|---|---|---|---|---|---|---|---|---|---|---|---|

| Format | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | F | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | D | U | D | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | D | D | D | D | D | D | D | D |
| 55 | D | D | F | F | F | U | U | U | D | D | D | D | D | D |

TABLE 4-continued

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 56-254 | Reserved | | | | | | | | | | | | | |
| 255 | UE determines the slot format for the slot based on TDD-UL-DL-ConfigurationCommon, or TDD-UL-DL-ConfigDedicated and, if any, on detected DCI formats | | | | | | | | | | | | | |

For the 5G mobile communication service, an additional coverage extension technology has been introduced compared to the LTE communication service, but the coverage of the actual 5G mobile communication service may generally use a time division duplex (TDD) system suitable for a service with a high proportion of DL traffic. In addition, as a center frequency increases in order to increase a frequency band, the coverage of the BS and the UE decreases, and thus, coverage enhancement is a key requirement of 5G mobile communication service. In particular, in order to support a service in which a transmission power of the UE is less than a transmission power of the BS and which has a higher proportion of DL traffic and because a ratio of DL is greater than that of UL in a time domain, coverage enhancement of a UL channel is a key requirement of 5G mobile communication service. As a method of physically improving the coverage of the UL channel between the BS and the UE, there may be a method of increasing a time resource of the UL channel, lowering the center frequency, or increasing the transmission power of the UE. However, changing the frequency may be limited because the frequency band is determined for each network operator. In addition, increasing the maximum transmission power of the UE may be limited because the maximum value is determined to reduce interference, that is, there may be restrictions because the maximum transmission power of the UE is determined by regulation.

Therefore, in order to improve the coverage of the BS and the UE, in the TDD system, division is not performed in terms of ratio in the time domain according to a weight of UL and DL traffic, but UL and DL resources may be also divided in the frequency domain as in a frequency division duplex (FDD) system. In an embodiment, a system in which a UL resource and a DL resource may be flexibly divided in the time and frequency domains may be referred to as a cross division duplex (XDD) system, a flexible TDD system, a hybrid TDD system, a TDD-FDD system, a hybrid TDD-FDD system, etc. However, the system is described as a TDD system, for convenience of description. According to an embodiment, X in XDD may mean time or frequency.

Figure 10:
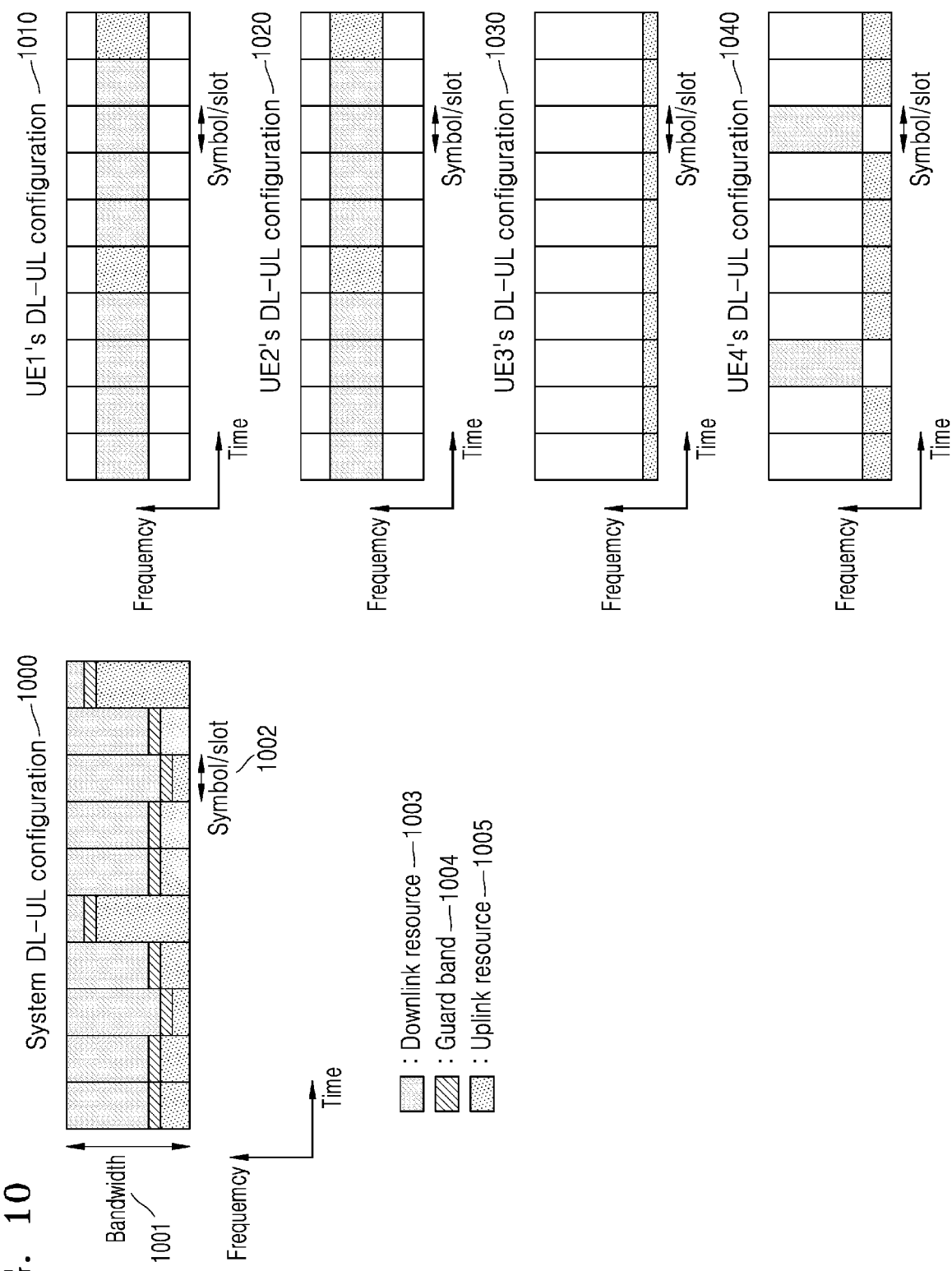
FIG. 10 is a diagram illustrating an uplink-downlink configuration of a time or frequency division duplexing (XDD) in which resources of uplink and downlink are flexibly divided in a time domain and a frequency domain, according to an embodiment of the disclosure.

FIG. 10 is a diagram illustrating a UL-DL configuration of an XDD system, in which UL and DL resources are flexibly divided in a time domain and a frequency domain, according to an embodiment of the disclosure.

Referring to FIG. 10, from the viewpoint of the BS, in a UL-DL configuration 1000 of an entire XDD system, a resource may be flexibly allocated for each symbol or slot 1002 according to a weight of UL and DL traffic, with respect to the entire frequency band 1001. At this time, a guard band 1004 may be allocated between frequency bands of a DL resource 1003 and a UL resource 1005. This guard band 1004 may be allocated for reducing interference in UL channel or signal reception due to out-of-band emission that occurs when a BS transmits a DL channel or signal in the DL resource 1003. At this time, for example, in a UE 1 (1010) and a UE 2 (1020), in which DL traffic is overall greater than UL traffic by the configuration of the BS, a resource ratio of DL to UL may be 4:1 in the time domain. At the same time, a UE 3 (1030) which operates at a cell edge where the UL coverage is insufficient, may receive only UL resources in a certain time period by the configuration of the BS. In addition, a UE 4 (1040), in which the UL coverage is insufficient because it operates at a cell edge, but an amount of UL and DL traffic is relatively large may receive many UL resources in the time domain and receive many DL resources in the frequency band. As in the example described above, there is an advantage in that more DL resources may be allocated in the time domain to UEs which operate in the center of a cell and has a relatively large amount of DL traffic, and more UL resources may be allocated in the time domain to UEs which operate on the edge of the cell and in which the UL coverage is insufficient.

The disclosure provides a method of configuring UL-DL resources of a time domain and a frequency domain and relates to a method and apparatus for transmitting and receiving a channel and signal by a BS and a UE accordingly in an XDD system in which UL and DL resources are flexibly allocated in time and frequency domains according to a weight of UL and DL traffic.

Hereinafter, the disclosure proposes a method of configuring UL and DL resources for coverage enhancement and a method and apparatus for transmitting and receiving a channel and signal of a BS and a UE accordingly. However, the disclosure may be applied to a method and apparatus for transmitting and receiving a channel and signal for a service (e.g., URLLC, etc.) that may be provided in a 5G system for a purpose other than coverage enhancement. In addition, the disclosure hereinafter proposes a method and apparatus for transmitting and receiving a channel and signal of a BS and a UE in an XDD system, but is not limited thereto, and may be applied to a method and apparatus for transmitting and receiving a channel and signal in another division duplex system that may be provided in a 5G system.

Example 1

Example 1 of the disclosure relates to a method and apparatus for resource configuration for UL or DL transmission and reception in time and frequency domains through cell-specific configuration information in an XDD system. Through the method of resource configuration for UL or DL transmission and reception according to an embodiment of the disclosure, a UE may be configured with UL and DL resources in the same time domain but in different frequency domain. Accordingly, the number of time domain resources in which the UE may perform UL transmission or DL reception may increase, and thus, the UL coverage of the UE and the BS may be enhanced as described above. Hereinafter, for convenience of description, a resource configuration for UL or DL transmission and reception is referred to as a UL-DL configuration.

Specifically, as described above, because the UE may receive a resource for UL and DL transmission and reception in a divided manner not only in a time domain but also in a frequency domain in an XDD system, a resource configuration for UL or DL transmission and reception is configured not only in the time domain but also in both the time and frequency domains, as in the TDD system. The BS configures a guard band as described above, through a resource configuration for UL or DL transmission and reception in a time domain and a frequency domain so that an interference effect due to an out-of-band (OOB) emission caused by a relative closeness between frequency bands of uplink and downlink resources may be controlled. In addition, even when a UL bandwidth part (BWP) has a same center frequency as a DL BWP, a frequency band in which scheduling and transmission and reception are performed may be determined through resource configuration for UL or DL transmission and reception in the time domain and the frequency domain.

Accordingly, a method of UL or DL configuration in the time domain and the frequency domain in the XDD system is provided.

As a method of resource configuration for UL or DL transmission and reception in the time domain and the frequency domain in the XDD system, the following methods may be considered.

[Method 1]

For the resource configuration for UL or DL transmission or reception in the time domain and the frequency domain, the BS may indicate, to the UE, a UL and DL configuration in the time domain for each frequency band by dividing the entire frequency band into n frequency bands (a method of performing division into n is suggested in Example 2). Each of the n frequency bands may include a group of consecutive resource blocks, and they may be called a resource block set (RBS) or a resource block group, but for convenience of description, they are herein described as "RBS". In each of the frequency bands, the UL-DL configuration information may include UL-DL pattern information and subcarrier information which serves as a reference therefor. In the UL-DL pattern information, a pattern period 903 in the time domain, the number 911 of consecutive DL slots from a starting point of each pattern, the number 912 of symbols of a next slot, the number 913 of consecutive UL slots from an end of a pattern, and the number 914 of symbols of a next slot may be indicated. In this case, slots and symbols that are not indicated as UL and DL may be determined as flexible slots/symbols.

Figure 11:
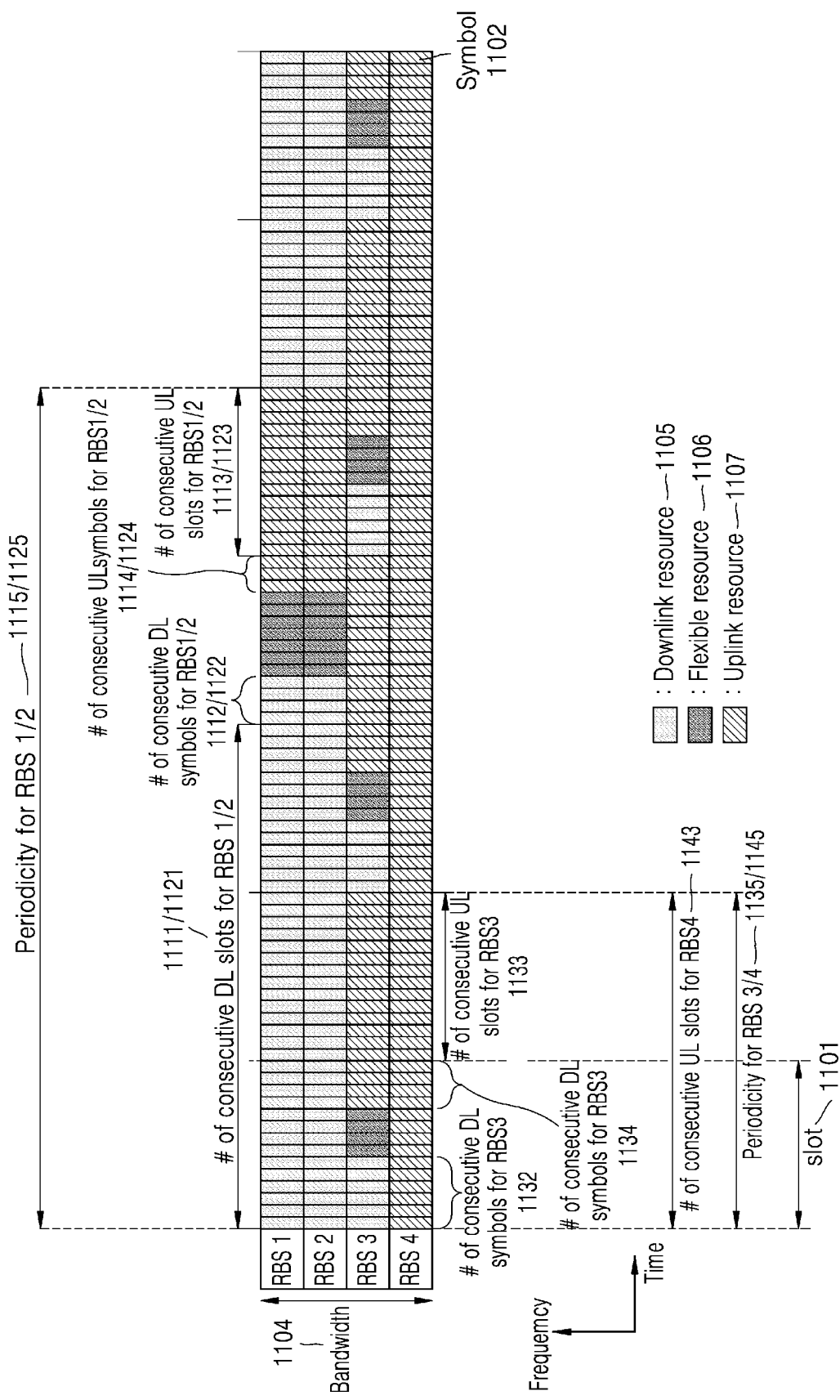
FIG. 11 is a diagram illustrating an uplink-downlink configuration of time and frequency in an XDD system according to an embodiment of the disclosure.

FIG. 11 is a diagram illustrating a UL-DL configuration of time and frequency in an XDD system according to an embodiment of the disclosure.

Referring to FIG. 11, the entire frequency band is divided into RBS 1110, 1120, 1130, and 1140 (n=4), and UL-DL in each time domain is configured. For example, it may be indicated that a pattern period of an RBS 1 (1110) is five slots (1115) (or 5 ms when an SCS is 15 kHz), the number of consecutive DL slots from the starting point of a pattern is three (1111), the number of DL symbols of a next slot is four (1112), the number of consecutive UL slots from the end of a pattern is one (1113), and the number of UL symbols of the next slot is three (1114). A UL-DL configuration of an RBS 2 (1120) may be the same as that of an RBS 1 (1110). It may be indicated that a UL-DL pattern period of an RBS 3 (1130) is two slots 1135 (or 2 ms when an SCS is 15 kHz), the number of consecutive DL slots from the starting point of the pattern is zero, the number of DL symbols of the next slot is six (1132), the number of consecutive UL slots from the end of a pattern is one (1133), and the number of UL symbols of the next slot is four (1134). Finally, it may be indicated that a UL-DL pattern period of an RBS 4 (1140) is two slots 1135 (or 2 ms when an SCS is 15 kHz), the number of consecutive DL slots from the starting point of a pattern is zero, the number of DL symbols of a next slot is zero, the number of consecutive UL slots from the end of a pattern is two (1133), and the number of UL symbols of the next slot is zero (1134).

For UL-DL configuration, each pattern has a period of time domain within a limited overhead and UL-DL is configured in the frequency domain, and thus, UL or DL may be configured relatively flexibly in the frequency domain.

[Method 2]

When UL-DL of the time domain and the frequency domain are configured, the BS indicates, to the UE, a UL-DL configuration in the frequency domain by dividing the entire frequency into n frequency domains. In each of the patterns, the UL-DL configuration information may include UL-DL pattern information and subcarrier information which serves as a reference therefor. In the UL-DL pattern information, the number of slot(s)/symbol(s) of the time domain having the same pattern, the number of consecutive DL RBS from the starting point of the entire frequency domain, the number of DL RBs of a next RBS, the number of consecutive UL RBS from the end of the entire frequency domain, and the number of UL RBs of the next RBS may be indicated. At this time, RBS and RBs not indicated as UL and DL may be determined as flexible RB S/RB s.

Figure 12:
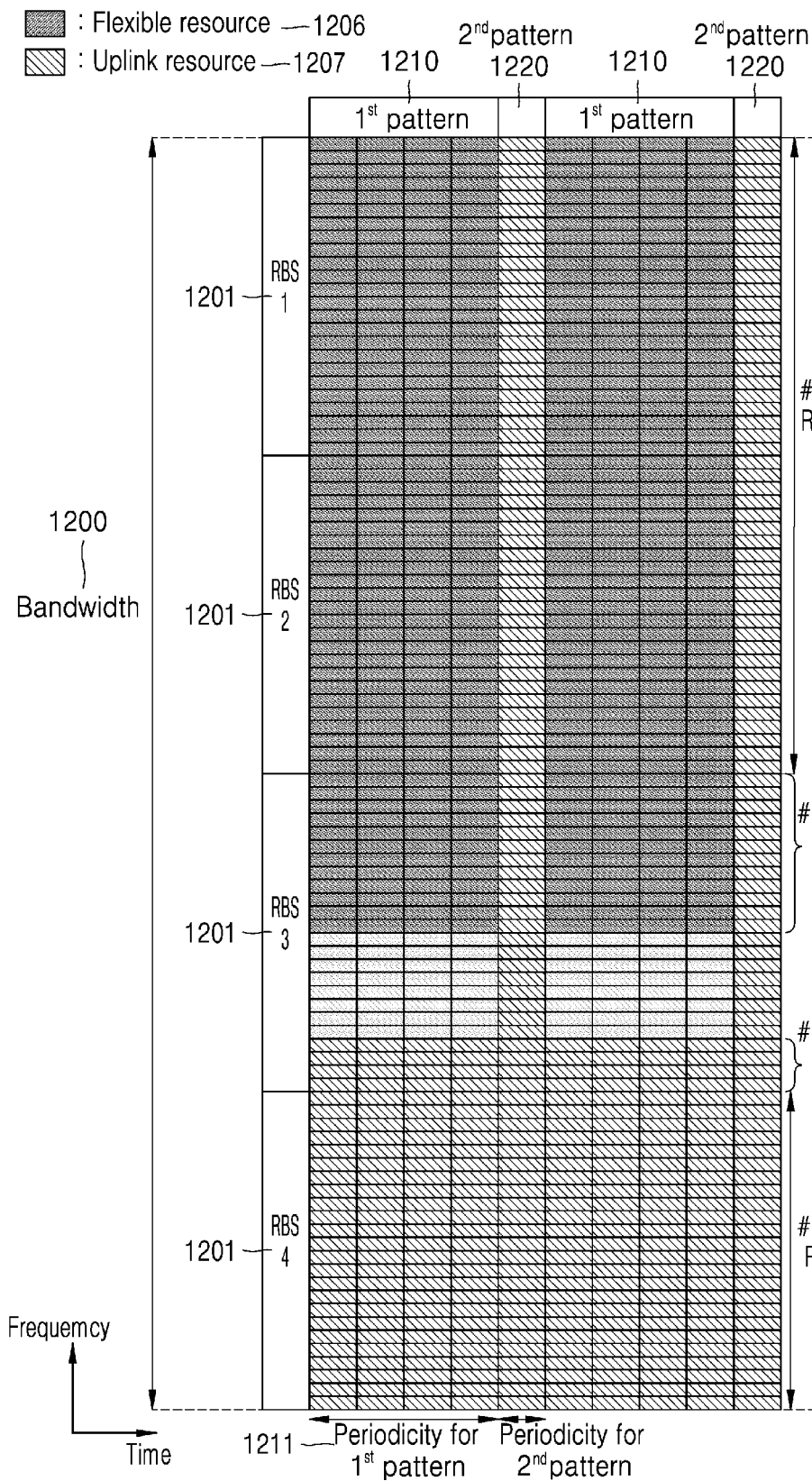
FIG. 12 is a diagram illustrating an uplink-downlink configuration of time and frequency in an XDD system according to another embodiment of the disclosure.

FIG. 12 is a diagram illustrating a UL-DL configuration of time and frequency in an XDD system according to another embodiment of the disclosure.

Referring to FIG. 12, the entire frequency band 1200 may be divided into RBS 1201, 1202, 1203, and 1204 (n=4) so that each of the RBS includes 24 RBs and UL-DL of the frequency domain may be configured for each pattern. For example, it may be indicated that a period of a first pattern 1210 is four slots (1211, or 4 ms when an SCS is 15 kHz), the number of consecutive DL RBS from the starting point of the entire frequency band is two (1212), the number of DL RBs of the next RBS is twelve (1213), the number of consecutive UL RBS from the end of the entire frequency band is one (1214), and the number of UL RBs of the next RBS is four (1215). It may be indicated that the period of a second pattern 1220 is one slot (1221, or 1 ms when an SCS is 15 kHz), and the number of consecutive UL RBS from the end of the entire frequency band is four (1224).

For UL-DL configuration, each pattern has a period of time domain within a limited overhead and UL-DL is configured in the frequency domain, and thus, UL or DL may be configured relatively flexibly in the frequency domain. In this case, a guard band may be efficiently configured in the XDD system as a way to reduce interference of UL channel or signal reception due to OOB emission that occurs when the BS transmits a DL channel or signal in the DL resource.

Example 2

In Example 2 of the disclosure, a method of dividing the entire frequency band into n frequency domains in Example 1 of the disclosure. Specifically, in the XDD system, it is necessary to divide frequency resources by specific unit to configure UL-DL resources, rather than dividing the UL and DL resources in the time domain only, as in the TDD system. In particular, in a case in which the entire frequency domain is 100 MHz, when the SCS is 30 kHz, 273 RBs may be included. In this case, in order to configure each of the RBs as a UL or DL resource, a considerable amount of overhead may be needed.

Accordingly, as a method of dividing a frequency band into groups for UL-DL configuration of a time domain and a frequency domain in the XDD system, the following methods may be considered.

[Method 1]

RBs of the frequency band may consist of n groups of a specific number of RBs. The number of RBs per group may consist of n groups through a UL-DL pattern configuration or based on a predetermined number. For example, when an SCS is 30 kHz and the entire frequency band is 100 MHz, the number of the entire RBs is 273. At this time, the number of RBs per group may be 24 and may be indicated as being included in the UL-DL pattern configuration, or when the predetermined number is configured as 24, may consist of a total of n=⌈total number of RBs/number of RBs configured per group⌉=⌈273/24⌉=12 groups. This may be efficiently determined in order to reduce overhead for UL-DL configuration of the frequency domain as described above.

The above-described method is a method for configuring RBs of a frequency band into n groups of a specific RBs, is not limited to a UL-DL pattern configuration or to a predetermined value in receiving the number of RBs per group, and may be also included in an SIB, user-specific configuration information through dedicated higher-layer signaling, medium access control control element (MAC CE), or DL control information that is L1 signaling.

[Method 2]

The entire frequency band may consist of n groups of a specific frequency band. A specific frequency band value per group may consist of n groups through UL-DL pattern configuration or based on a predetermined number. For example, when the frequency band per group being 20 MHz out of the entire frequency band of 100 MHz is included in the UL-DL pattern configuration and indicated, or a predetermined frequency band is configured as 20 MHz, a total of n=⌈entire frequency band/frequency band configured per group⌉=⌈100/20⌉=5 groups may be configured. This may be efficiently determined to reduce overhead for UL-DL configuration of the frequency domain as described above.

The above-described method is a method for configuring a frequency band into n groups of a specific frequency band, is not limited to a UL-DL pattern configuration in receiving a frequency band value per group, and may be included in predetermined RB number system information, user-specific configuration information through dedicated higher-layer signaling, or DL control information that is L1 signaling.

[Method 3]

The entire frequency band may consist of two groups based on a guard band. A frequency band of the guard band may be indicated through UL-DL pattern configuration, and two groups, e.g., a frequency band less than the guard band and a frequency band greater than the guard band, may be configured based on the guard band. For example, in the entire frequency band of 100 MHz, when a starting point and size of the guard band is configured as 500 common RBs (CRB) with the 100th CRB based on a point A, the group may be divided into a first group from the point A to a 99th CRB, which is in a less frequency band than the guard band, and a second group from a 150th CRB to a last CRB. This may be efficiently determined to reduce overhead for UL-DL configuration of the frequency domain as described above. In particular, to allocate a resource such that DL or UL is not consecutive at a same time point, it is very difficult to implement a BS, and as described above, interference due to an OOB may occur between the UL and the DL. Therefore, when the DL or the UP has to be configured to be always consecutive, two groups may be efficiently divided by a guard band configured between the DL and the UL.

The above-described method is a method for configuring a frequency band as two groups based on a guard band, is not limited to UL-DL pattern configuration in receiving a configuration related to the guard band, and may be included in a predetermined RB number SIB, user-specific configuration information through dedicated higher-layer signaling, an MAC CE, or DL control information that is L1 signaling.

Example 3

In Example 3 of the disclosure, when a DL resource and a UL resource are simultaneously configured in a frequency domain in an XDD system at one time point as described above, a guard band may be allocated as a way to reduce interference of UL channel or signal reception due to an OOB emission that occurs when the BS transmits a DL channel or signal in the DL resource 1003. At this time, when a guard band is not present, the UE may determine that only a DL or UL resource is present at one time point, and when a guard band is configured, the UE may determine that DL and UL resources are simultaneously present in the frequency domain at one time point. In addition, as described above, to allocate a resource such that DL or UL is not consecutive at a same time point, it is very difficult to implement the BS, and as described above, interference due to an OOB may occur between the UL and the DL. Accordingly, by configuring the guard band, the UE and the BS may indirectly distinguish between the DL resource and the UL resource.

As described above, because the guard band is a method for resolving an interference issue that occurs when a UL reception and a DL transmission are simultaneously performed, a basic configuration of the guard band, i.e., a position and size of a frequency band, an SCS, etc., may be semi-statically configured. Accordingly, configuration information of the guard band may be included in cell-specific configuration information through higher-layer signaling (including system information). At this time, rather than applying the guard band in all cases, applying the guard band only when coverage is to be enhanced by using an XDD system or in an environment in which various UEs having various traffic are simultaneously supported may be more efficient. Therefore, application such as enabling (application during a specific preset time from a configured DCI or application during a time configured by the DCI from the configured DCI) or activating (continuous application until release from receiving a configuration) the guard band is needed. More specifically, the enable of a guard band indicates that when the following condition is satisfied, a guard band is configured up to a slot/symbol predetermined (included in RRC signaling) or configured (included in a DCI) of a UE and a BS from a specific time after a PDCCH including the DCI) is received, and the activation of the XDD system indicates that when the following condition is satisfied, the guard band is configured until before release.

Therefore, as a way to enable (activate) the guard band in the XDD system, the following methods may be considered.

[Method 1]

The BS may explicitly configure the UE whether a guard band configuration is enabled (or activated) by using a new parameter, e.g., 1 bit.

More specifically, in a case in which the guard band is enabled/disabled, when a new parameter is configured as "0" (disable), the UE may transmit and receive a signal according to a TDD UL-DL configuration configured in the existing TDD system. On the contrary, when a new parameter is configured as "1" (enable), the UE may determine a position of the guard band and transmit and receive a signal based on a position and size of the frequency band, an SCS, etc. received through higher-layer signaling. (At this time, a method of determining a position of a guard band and transmitting and receiving a signal by a UE is described in detail in Example 4).

In a case of activation/release, when a new parameter is configured as "0" (release), the UE may transmit and receive a signal according to a TDD UL-DL configuration configured in the existing TDD system until before activation. On the contrary, when a new parameter is configured as "1" (activation), the UE may determine the position of the guard band and transmit and receive a signal based on a position and size of a frequency band, an SCS, etc., received through higher-layer signaling until before release. (At this time, a method of determining the position of the guard band and transmitting and receiving a signal by a UE is described in detail in Example 4)

[Method 2]

As described above, an environment in which a dynamic change from a TDD system to an XDD system is to be performed corresponds to an environment in which the decoding performance of data is to be improved by enhancing a channel estimation performance when UEs are present at a cell edge or when a reception signal-to-noise ratio (SNR) of the BS is low. The most important factor in the following environment is a transmission power of the UE. When the UE is present at a cell edge or a reception SNR of a BS is low, the BS may be configured to first maximize the use of transmission power of the UE.

Even when the UEs use the maximum transmission power, when the reception SNR of the BS is low, the BS may configure a guard band to expand UL time resources that the UEs lack, to the XDD system. That a UE uses the maximum transmission power indicates that a positive value is not used in a transmit power control (TPC) command included in DCI. That is, both the BS and the UE identify that the UE uses the maximum transmission power in the UL, the BS does not configure a positive TPC command field value to the UE and thus, that value is meaningless. Based on the this, when both the UE and the BS identify that the UE uses the maximum transmission power, a guard band may be configured as enable (or active) through L1 signaling by not using a positive value for a TPC command field.

For example, as in [Table 5] below, the BS may configure enable (activate) or disable (release) a configuration of the number of OFDM symbols of a DMRS implicitly or explicitly configured through L1 signaling, instead of OFDM symbols of the DMRS determined through RRC signaling.

TABLE 5

| TPC Command Field | Accumulated [dB] | Absolute [dB] | Enable or Disable |
|---|---|---|---|
| 0 | −1 | −4 | — |
| 1 | 0 | −1 | — |
| 2 | 1 | 1 | Disable (release) |
| 3 | 3 | 4 | Enable (activation) |

The above-described Method 1 and Method 2 may be operated in combination with each other.

Figure 13:
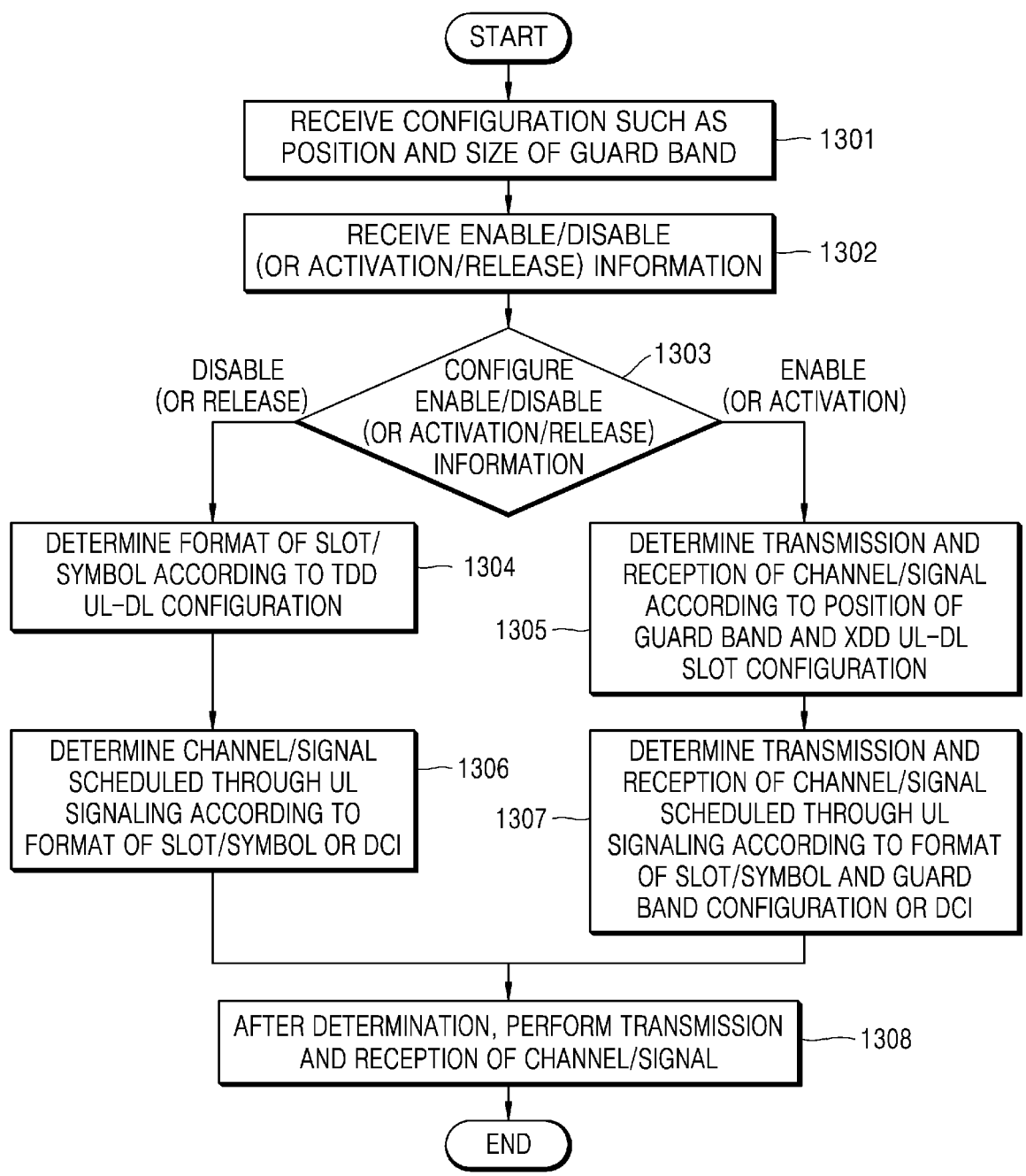
FIG. 13 is a flowchart for describing an operation of a user equipment (UE) when a guard band is configured, according to an embodiment of the disclosure.

FIG. 13 is a flowchart illustrating an operation of a UE when a guard band is configured according to an embodiment of the disclosure.

Specifically, FIG. 13 is a flowchart for explaining an operation of the UE according to Example 3.

The UE may receive the guard band position and size configuration information in operation 1301. The UE may receive information for dynamically enabling/disabling (or activating/releasing) the presence or absence of a guard band in operation 1302. Meanwhile, operations 1301 and 1302 are sequentially described for convenience of description, and the corresponding operations may be performed at the same time or may be performed by changing the order of each operation. The UE dynamically determines whether the guard band is enabled/disabled (or active/released) in operation 1303.

When the UE determines that the guard band is dynamically disabled (or released) in the operation 1303, the UE may determine whether a slot/symbols is in a UL, DL, or flexible format according to a TDD UL-DL configuration through RRC signaling in the operation 1304. The UE determines (1306) whether or not to perform transmission and reception of a channel/signal scheduled through UL signaling or DCI according to a format of a slot/symbol.

When the UE determines that the guard band is dynamically enabled (or activated) in the operation 1303, the UE may determine whether a slot/symbol is a UL, DL, or a flexible format or a guard band in the time domain and the frequency domain by using a UL_DL configuration (Method 1 or 2 of Example 1) in the operation 1305. The UE may determine (1307) whether or not to perform transmission and reception of a channel/signal scheduled through UL signaling or DCI according to a format of the slot/symbol and a guard band configuration in the time and frequency domains. Finally, in operation 1308, the UE performs transmission and reception of a channel/signal based on whether to perform the transmission and reception determined in the operation 1306 or 1307.

The channel/signal described in the above method may be applied to a UL data channel, a UL control channel, a UL reference signal, a DL data channel, a UL control channel, a DL reference signal, etc.

Example 4

Example 4 of the disclosure relates to a method of transmitting a UL channel/signal by a UE when UL-DL of a time domain and a frequency domain is configured in an XDD system through Example 1. By using the UL channel or signal transmission method described in the present embodiment, a UL channel or signal, which could not be transmitted due to the existing configuration in the time domain, may be transmitted, and thus, UL coverage of the BS and the BS may be enhanced.

An embodiment of the disclosure is not limited to a method of transmitting, by a UE, a UL channel/signal when UL-DL of a time domain and a frequency domain is transmitted, but may be applied to a method of receiving a DL channel/signal by a UE.

Specifically, UL-DL of the time domain and the frequency domain may be configured in the XDD system as described above (Example 1). At this time, UL, DL, flexible, or guard band (Example 3) may be configured in both the time domain and the frequency domain by the above configuration, and thus, the UL, DL, flexible, and the guard band may co-exist in the frequency domain in the symbol(s)/slot(s). At this time, as described above, when the existing TDD system is changed to the XDD system, a UL-DL configuration may be changed in the time-frequency. In particular, because a UL channel/signal scheduled through higher-layer signaling for a specific reason is semi-statistically determined, and thus may not be dynamically changed when the UL-DL configuration is changed in the time-frequency. In this configuration, regarding a UL channel/signal transmission scheduled through higher-layer signaling, a UE may not perform transmission in order to avoid interference as described above, for a resource configured for a guard band and DL, but may transmit a resource configured for UL with no problem. When a UL-DL is configured only in the time domain, a BS may dynamically make a change to a different format in a symbol/slot configured as flexible, and thus, a UL channel/signal is not transmitted. However, in the XDD system, it may be difficult to dynamically change a flexible resource to a different type due to an implementation problem of the BS as described above. Therefore, when the UL channel/signal is transmitted on the flexible resource, the UL coverage may be enhanced.

Therefore, in the XDD system, as a method of determining whether a UL channel and signal is transmitted by a UE on a resource configured as flexible in the frequency domain, the following methods may be considered.

[Method 1]

In a case of receiving a UL-DL configuration in the time domain and the frequency domain, when the UL-DL configuration information overlaps at least a part of the resource configured as flexible, the UE transmits a UL data channel scheduled through higher-layer signaling, a control channel, an RACH, and a sounding reference signal (SRS). In this case, the UE transmits an UL signal even on the resource configured as flexible, thereby enhancing the UL coverage.

Figure 14:
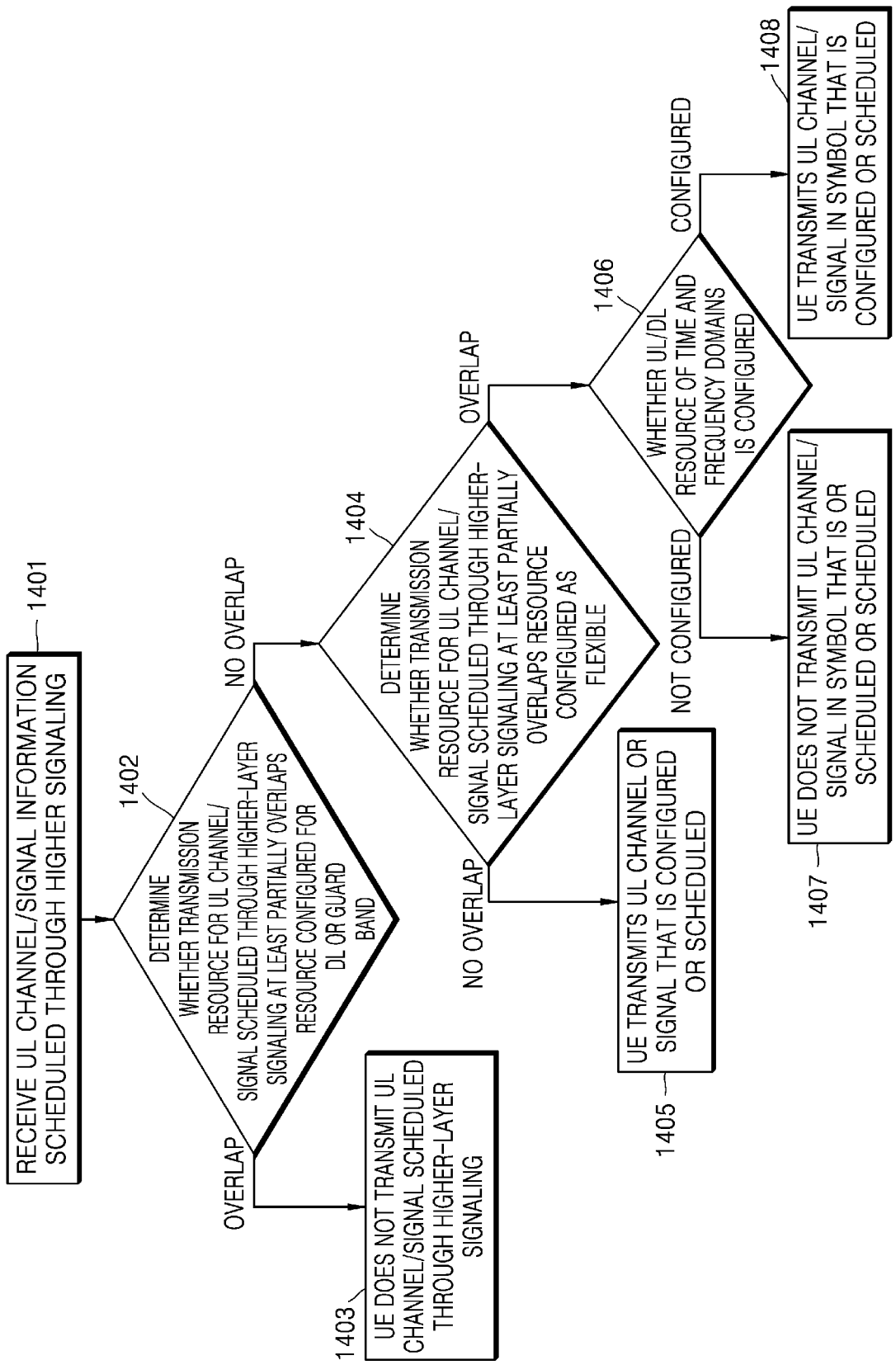
FIG. 14 is a diagram illustrating a method for a UE to determine whether an uplink channel and signal are transmitted, according to an embodiment of the disclosure.

FIG. 14 is a diagram illustrating a method for a UE to determine whether a UL channel and signal are transmitted, according to an embodiment of the disclosure.

Referring to FIG. 14, the UE receives UL channel/signal information scheduled through higher-layer signaling (operation 1401). The UE determines whether a transmission resource for UL data scheduled through higher-layer signaling, a control, an RACH, or an SRS overlaps at least a part of a resource configured for DL or a guard band (operation 1402). When the transmission resource for the UL data scheduled through higher-layer signaling, the control, the RACH, or the SRS overlaps at least a part of the resource configured for DL or the guard band, the UE does not transmit the UL channel/signal scheduled through higher-layer signaling (operation 1403). When the transmission resource for the UL data scheduled through higher-layer signaling, the control, the RACH, or the SRS does not overlap the resource configured for the DL or the guard band at all, the UE determines whether the transmission resource for the UL data scheduled through higher-layer signaling, the control, the RACH, or the SRS overlaps at least a part of a resource configured as flexible (operation 1404). When the transmission resource for the UL data scheduled through higher-layer signaling, the control, the RACH, or the SRS does not overlap the resource configured as flexible at all, the UE transmits a UL channel/signal scheduled through higher-layer signaling (operation 1405). Meanwhile, when the transmission resource for the UL data scheduled through higher-layer signaling, the control, the RACH, or the SRS overlaps at least the part of the resource configured as flexible, the UE determines whether a UL-DL resource of the time and frequency domains is configured (operation 1406). When the UL-DL configuration is performed only in the time domain, the UE does not transmit the UL channel/signal scheduled through higher-layer signaling (operation 1407). When the UL-DL resource configuration is performed in the time domain and the frequency domain, the UE transmits the UL channel/signal scheduled through higher-layer signaling (operation 1408).

[Method 2]

When the UE is configured with UL-DL in the time domain and the frequency domain, the UE transmits a UL data channel, a control channel, a random access channel, and an SRS, which are scheduled through higher-layer signaling, on a resource configured as flexible and a resource configured for UL on which UL-DL configuration information overlaps. Like the above [Method 1], the UE transmits a UL signal also on the resource configured as flexible to thereby enhance the UL coverage. However, as described above, when a resource on which a channel/signal scheduled through higher-layer signaling is transmitted is a resource configured as flexible only, the BS may configure the resource as a resource for resolving OOB interference rather than as a resource for UL. Therefore, when the resource on which the channel/signal scheduled through higher-layer signaling is transmitted is a resource configured as flexible only, the UL channel/signal is not transmitted, and when a part of the resource which is configured for UL is included, the UL channel/signal is transmitted.

Figure 15:
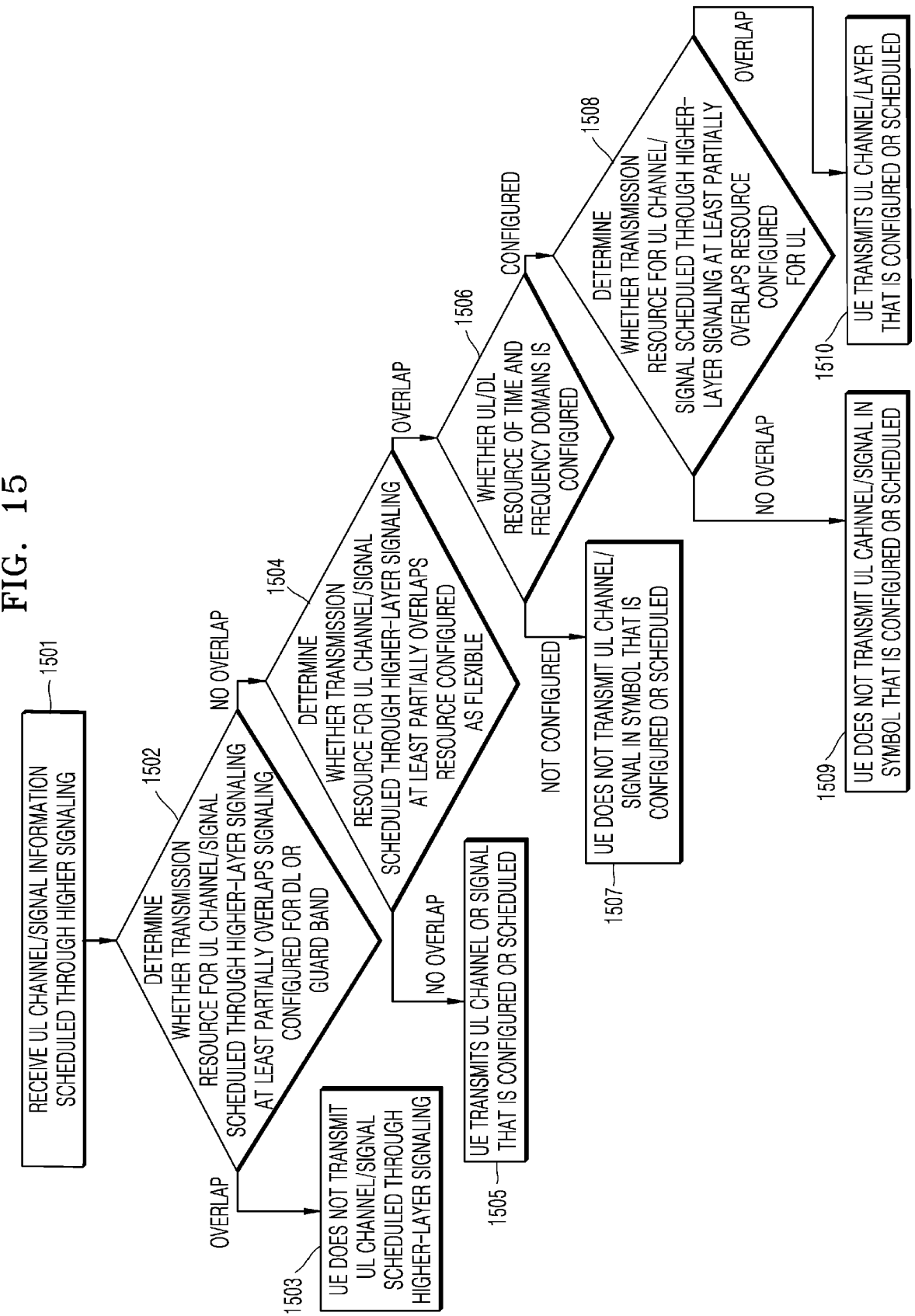
FIG. 15 is a diagram illustrating a method for a UE to determine whether an uplink channel and signal are transmitted, according to another embodiment of the disclosure.

FIG. 15 is a diagram illustrating a method for a UE to determine whether another UL channel and signal is transmitted, according to an embodiment of the disclosure.

Referring to FIG. 15, the UE receives UL channel/signal information scheduled through higher signaling (operation 1501). The UE determines whether a transmission resource for UL data scheduled through higher-layer signaling, a control channel, an RACH, or an SRS overlaps at least a part of a resource configured for DL or a guard band (operation 1502). When the transmission resource for the UL data scheduled through higher-layer signaling, the control, the RACH, or the SRS overlaps at least a part of the resource configured for DL or the guard band, the UE does not transmit the UL channel/signal scheduled through higher-layer signaling (operation 1503). When the transmission resource for the UL data scheduled through higher-layer signaling, the control, the RACH, or the SRS does not overlap the resource configured for the DL or the guard band at all, the UE determines whether the transmission resource for the UL data scheduled through higher-layer signaling, the control, the RACH, and the SRS overlaps at least a part of the resource configured as flexible (operation 1504). When the transmission resource for the UL data scheduled through higher-layer signaling, the control, the RACH, or the SRS does not overlap the resource configured as flexible at all, the UE transmits the UL channel/signal scheduled through higher-layer signaling (operation 1505). When the transmission resource for the UL data scheduled through higher-layer signaling, the control, the RACH, or the SRS overlaps at least a part of the resource configured as flexible, the UE determines whether the UL-DL resource of the time domain and the frequency domain is configured (operation 1506). When the UL-DL configuration is configured only in the time domain, the UE does not transmit the UL channel/signal scheduled through higher-layer signaling (operation 1507). When the UL-DL resource configuration is performed in the time domain and the frequency domain, the UE determines whether the transmission resource for the UL data scheduled through higher-layer signaling, the control, the RACH, or the SRS overlaps at least a part of the resource configured for UL (operation 1508). When the transmission resource for the UL data scheduled through higher-layer signaling, the control, the RACH, and the SRS does not overlap the resource configured for UL at all, the UE does not transmit the UL channel/signal scheduled through higher-layer signaling (operation 1509). When the transmission resource for the UL data scheduled through higher-layer signaling, the control, the RACH, or the SRS overlaps at least a part of the resource configured for UL, the UE transmits the UL channel/signal scheduled through higher-layer signaling (operation 1510).

Figure 16:
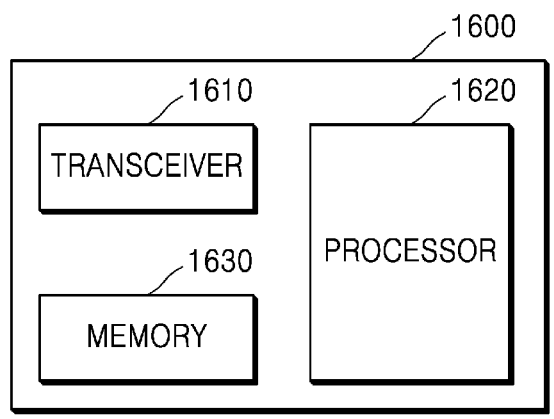
FIG. 16 is a block diagram of a UE according to an embodiment of the disclosure.

FIG. 16 is a block diagram of a UE according to an embodiment of the disclosure.

Referring to FIG. 16, a UE 1600 may include a transceiver 1610, a controller 1620, and a storage 1630. According to an efficient channel and signal transmission and reception method in the 5G communication system corresponding to the above-described embodiment, the transceiver 1610, the controller 1620, and the storage 1630 of the UE 1600 may be operated. However, elements of the UE 1600 according to an embodiment are not limited thereto. According to another embodiment, the UE 1600 may include more or fewer elements than those illustrated in FIG. 11. In a specific case, the transceiver 1610, the controller 1620, and the storage 1630 may be implemented as one chip.

The transceiver 1610 may include a transmitter and a receiver according to another embodiment. The transceiver 1610 may transmit or receive a signal to or from a BS. The signal may include control information and data. To this end, the transceiver 1610 may include a RF transmitter for up-converting and amplifying a frequency of signals to be transmitted, and an RF receiver for low-noise-amplifying and down-converting a frequency of received signals. In addition, the transceiver 1610 may receive a signal via a wireless channel and output the signal to the controller 1620, or transmit a signal output from the controller 1620 via a wireless channel.

The controller 1620 may control a series of processes in which the UE 1600 may operate according to the above-described embodiment of the disclosure. For example, the controller 1620 may differently control a method of UL-DL configuration of a time domain and a frequency domain in an XDD system according to an embodiment of the disclosure, a method of guard band configuration when a DL resource and a UL resource are simultaneously configured in the frequency domain at one time point in the XDD system, a method for a UE to transmit a UL channel/signal when a UL-DL is configured in the time domain and the frequency domain in the XDD system, a method of receiving a DL channel/signal, etc. The storage 1630 may store UL-DL configuration information included in a signal obtained by the UE 1600, control information such as guard band configuration information, or data, and may have an area for storing data necessary for controlling by the controller 1620, data generated when the controller 1620 performs a control, etc.

Figure 17:
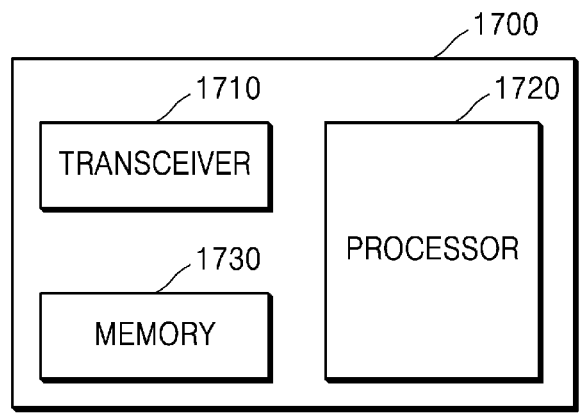
FIG. 17 is a block diagram of a base station (BS) according to an embodiment of the disclosure.

FIG. 17 is a block diagram of a BS according to an embodiment.

Referring to FIG. 17, a BS 1700 may include a transceiver 1710, a controller 1720, and a storage 1730. According to an efficient channel and signal transmission and reception method in a 5G communication system corresponding to the above-described embodiment, the transceiver 1710, the controller 1720, and the storage 1730 of the BS 1700 may be operated. However, elements of the BS 1700 according to an embodiment are not limited thereto. According to another embodiment, the BS 1700 may include more or fewer elements than those described above. Further, in a specific case, the transceiver 1710, the controller 1720, and the storage 1730 may be implemented as one chip. The transceiver 1710 may include a transmitter and a receiver according to another embodiment. The transceiver 1710 may transmit and receive a signal to and from a UE. The signals may include control information and data. To this end, the transceiver 1710 may include a radio frequency (RF) transmitter for up-converting and amplifying a frequency of a transmitted signal, and an RF receiver for low-noise-amplifying and down-converting a frequency of a received signal. In addition, the transceiver 1710 may receive a signal via a wireless channel and output the signal to the controller 1720, or transmit a signal output from the controller 1720 via a wireless channel.

The controller 1720 may control a series of processes in which the BS 1700 may operate according to the above-described embodiment of the disclosure. For example, the controller 1720 may differently control a method of UL-DL configuration of a time domain and a frequency domain in an XDD system according to an embodiment of the disclosure, a method of guard band configuration when a DL resource and a UL resource are simultaneously configured in the frequency domain at one time point in the XDD system, a method for a BS to receive a UL channel/signal when UL-DL of the time domain and the frequency domain is configured in the XDD system, a method of transmitting a DL channel/signal, etc.

The storage 1730 may store UL-DL configuration information determined by the BS 1700, control information such as guard band configuration information, data, control information received from the UE, or data, and may have an area for storing data necessary for performing a control by the controller 1720, data generated when the controller 1720 performs a control, etc.

The disclosure may, however, be embodied in different forms and should not be construed as limited to embodiments of the disclosure set forth herein; rather, these embodiments of the disclosure are provided so that this disclosure is thorough and complete. That is, it will be obvious to one of ordinary skill in the art that various modifications may be made based on the technical spirit of the disclosure. Also, the embodiments of the disclosure may be combined with each other as required.

The methods according to the embodiments described in the claims or specification of the disclosure may be implemented in the form of hardware, software, or a combination of hardware and software.

When implemented as software, a computer-readable storage medium or a computer program product which stores one or more programs (e.g., software modules) may be provided. The one or more programs, which are stored in the computer-readable storage medium or the computer program product, are configured for execution by one or more processors in an electronic device. The one or more programs include instructions that cause an electronic device to execute the methods according to the embodiments of the disclosure set forth in the claims or specification.

Such programs (software modules or software) may be stored in a random access memory, a non-volatile memory such as flash memory, a read-only memory (ROM), an electrically erasable programmable ROM (EEPROM), a magnetic disc storage device, a compact disc-ROM (CD-ROM), a digital versatile disc (DVD), other types of optical storage devices, or a magnetic cassette. Otherwise, such programs may be stored in a memory which is a combination of some or all the above storage media. Alternatively, a plurality of such memories may be provided.

Also, the programs may be stored in an attachable storage device which is accessible via a communication network such as the Internet, an intranet, a local area network (LAN), a wireless LAN (WLAN), or a storage area network (SAN), or a combination thereof. The storage device may be connected via an external port to an apparatus performing the embodiments of the disclosure. Also, a separate storage device on a communication network may be connected to an apparatus performing an embodiment of the disclosure.

In the disclosure, the term 'computer program product' or 'computer-readable medium' is used to entirely refer to a medium such as a memory, a hard disk installed in a hard disk drive, or a signal. The "computer program product" or "computer-readable medium" are means provided to a method of performing channel and signal transmission and reception, according to the disclosure.

In the above particular embodiments of the disclosure, the components included in the disclosure are expressed in the singular or plural according to the presented particular embodiments of the disclosure. However, the singular or plural form is appropriately selected for convenience of descriptions and the disclosure is not limited thereto. As such, an element expressed in a plural form may also be configured as a single element, and an element expressed in a singular form may also be configured as plural elements.

Although embodiments of the disclosure have been described in the detailed description of the disclosure, various modifications may be made therein without departing from the scope of the disclosure. Therefore, the scope of the disclosure should not be limited to the above-described embodiments of the disclosure and should be determined by the appended claims and the equivalents thereof.

The invention claimed is:

1. A method of a user equipment (UE) in a wireless communication system, the method comprising:
    receiving, from a base station (BS), configuration information for a guard band in a frequency domain and an uplink-downlink configuration in a time domain and the frequency domain for a time or frequency division duplexing (XDD) system in which uplink and downlink resources are allocated in the time domain and the frequency domain according to a weight of uplink and downlink traffic;
    identifying whether the guard band in the frequency domain is activated based on a parameter received from the BS;
    in case that the uplink-downlink configuration indicates that the uplink and downlink resources are simultaneously configured in the frequency domain in the XDD system at one time point, and the guard band in the frequency domain is activated, receiving scheduling information for an uplink channel through higher layer signaling;
    in case that a transmission resource for the uplink channel overlaps at least a part of a resource configured for the downlink or the guard band in the frequency domain, determining not to transmit the uplink channel;
    in case that the transmission resource overlaps at least a part of a flexible resource and the transmission resource does not overlap a resource configured for the uplink, determining not to transmit the uplink channel; and
    in case that the transmission resource overlaps at least a part of the flexible resource and the transmission resource overlaps at least a part of the resource configured for the uplink, transmitting the uplink channel.

2. The method of claim 1, wherein the method further comprises:
    in case that the transmission resource does not overlap the resource configured for the downlink and the guard band in the frequency domain and the transmission resource does not overlap the flexible resource, transmitting the uplink channel.

3. The method of claim 1, wherein the uplink-downlink configuration in the time domain and the frequency domain includes uplink-downlink pattern information and subcarrier information, and
    wherein the uplink-downlink pattern information includes a number of consecutive downlink resource block sets (RBSs) from a starting point of frequency band, a number of downlink resource blocks (RBs) of a next RBS, a number of consecutive uplink RBSs from an end point of the frequency band, and a number of uplink RBs of a next RBS.

4. A user equipment (UE) in a wireless communication system, the UE comprising:
    a transceiver; and
    at least one processor operably coupled to the transceiver, wherein the at least one processor is configured to:
        receive, from a base station (BS), configuration information for a guard band in a frequency domain and an uplink-downlink configuration in a time domain and the frequency domain for a time or frequency division duplexing (XDD) system in which uplink and downlink resources are allocated in the time domain and the frequency domain according to a weight of uplink and downlink traffic;
        identify whether the guard band in the frequency domain is activated based on a parameter received from the BS;
        in case that the uplink-downlink configuration indicates that the uplink and downlink resources are simultaneously configured in the frequency domain in the XDD system at one time point, and the guard band in the frequency domain is activated, receive scheduling information for an uplink channel through higher layer signaling;
        in case that a transmission resource for the uplink channel overlaps at least a part of a resource configured for the downlink or the guard band in the frequency domain, determine not to transmit the uplink channel;
        in case that the transmission resource overlaps at least a part of a flexible resource and the transmission resource does not overlap a resource configured for the uplink, determine not to transmit the uplink channel; and
        in case that the transmission resource overlaps at least a part of the flexible resource and the transmission resource overlaps at least a part of the resource configured for the uplink, transmit the uplink channel.

5. The UE of claim 4, wherein the at least one processor is further configured to:
    in case that the transmission resource does not overlap the resource configured for the downlink and the guard band in the frequency domain and the transmission resource does not overlap the flexible resource, transmit the uplink channel.

6. The UE of claim 4, wherein the uplink-downlink configuration in the time domain and the frequency domain includes uplink-downlink pattern information and subcarrier information, and
    wherein the uplink-downlink pattern information includes a number of consecutive downlink resource block sets (RBSs) from a starting point of frequency band, a number of downlink resource blocks (RBs) of a next RBS, a number of consecutive uplink RBSs from an end point of the frequency band, and a number of uplink RBs of a next RBS.

7. A method of a base station (BS) in a wireless communication system, the method comprising:
- transmitting, to a user equipment (UE), configuration information for a guard band in a frequency domain and an uplink-downlink configuration in a time domain and the frequency domain for a time or frequency division duplexing (XDD) system in which uplink and downlink resources are allocated in the time domain and the frequency domain according to a weight of uplink and downlink traffic;
- in case that the uplink-downlink configuration indicates that the uplink and downlink resources are simultaneously configured in the frequency domain in the XDD system at one time point, and the guard band in the frequency domain is activated, transmitting scheduling information for an uplink channel through higher layer signaling; and
- receiving the uplink channel in case that a transmission resource for the uplink channel overlaps at least a part of a flexible resource and the transmission resource overlaps at least a part of a resource configured for uplink.

8. The method of claim 7, wherein the uplink-downlink configuration in the time domain and the frequency domain includes uplink-downlink pattern information and subcarrier information, and
wherein the uplink-downlink pattern information includes a number of consecutive downlink resource block sets (RBSs) from a starting point of frequency band, a number of downlink resource blocks (RBs) of a next RBS, a number of consecutive uplink RBSs from an end point of the frequency band, and a number of uplink RBs of a next RBS.

9. The method of claim 7, wherein the uplink channel is received in case that the transmission resource does not overlap a resource configured for the downlink or the guard band in the frequency domain and the transmission resource does not overlap the flexible resource.

10. A base station (BS) in a wireless communication system, the BS comprising:
- a transceiver; and
- at least one processor operably coupled to the transceiver, wherein the at least one processor is configured to:
  - transmit, to a user equipment (UE), configuration information for a guard band in a frequency domain and an uplink-downlink configuration in a time domain and the frequency domain for a time or frequency division duplexing (XDD) system in which uplink and downlink resources are allocated in the time domain and the frequency domain according to a weight of uplink and downlink traffic;
  - in case that the uplink-downlink configuration indicates that the uplink and downlink resources are simultaneously configured in the frequency domain in the XDD system at one time point, and the guard band in the frequency domain is activated, transmit scheduling information for an uplink channel through higher layer signaling; and
  - receive the uplink channel in case that a transmission resource for the uplink channel overlaps at least a part of a flexible resource and the transmission resource overlaps at least a part of a resource configured for uplink.

\* \* \* \* \*